US010503550B2

(12) United States Patent
Gupta et al.

(10) Patent No.: US 10,503,550 B2
(45) Date of Patent: Dec. 10, 2019

(54) DYNAMIC PERFORMANCE BIASING IN A PROCESSOR

(71) Applicant: Intel Corporation, Santa Clara, CA (US)

(72) Inventors: Monica Gupta, Hillsboro, OR (US); Russell J. Fenger, Beaverton, OR (US); Vijay Dhanraj, Beaverton, OR (US); Deepak Samuel Kirubakaran, Hillsboro, OR (US); Srividya Ambale, Hillsboro, OR (US); Israel Hirsh, Kiryat Motzkin (IL); Eliezer Weissmann, Haifa (IL); Hisham Abu Salah, Majdal shams (IL)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 15/721,858

(22) Filed: Sep. 30, 2017

(65) Prior Publication Data
US 2019/0102229 A1 Apr. 4, 2019

(51) Int. Cl.
G06F 9/50 (2006.01)
G06F 9/30 (2018.01)

(52) U.S. Cl.
CPC .............. G06F 9/50 (2013.01); G06F 9/5005 (2013.01); G06F 9/5027 (2013.01);
(Continued)

(58) Field of Classification Search
CPC ........ G06F 9/3009; G06F 9/50; G06F 9/5005; G06F 9/5027; G06F 9/5044; G06F 2209/501
(Continued)

(56) References Cited

U.S. PATENT DOCUMENTS 5,724,565 A 3/1998 Dubey et al.
5,787,490 A 7/1998 Ozawa
(Continued)

FOREIGN PATENT DOCUMENTS

CN 1410886 A 4/2003

OTHER PUBLICATIONS

Cazorla et al., "Predictable Performance in SMT Processors: Synergy between the OS and SMTs", IEEE Transactions on Computers, vol. 55, No. 7, Jul. 2006, pp. 785-799.
(Continued)

Primary Examiner — Qing Chen
(74) Attorney, Agent, or Firm — Alliance IP, LLC

(57) ABSTRACT

Technologies are provided in embodiments to dynamically bias performance of logical processors in a core of a processor. One embodiment includes identifying a first logical processor associated with a first thread of an application and a second logical processor associated with a second thread, obtaining first and second thread preference indicators associated with the first and second threads, respectively, computing a first relative performance bias value for the first logical processor based, at least in part, on a relativeness of the first and second thread preference indicators, and adjusting a performance bias of the first logical processor based on the first relative performance bias value. Embodiments can further include increasing the performance bias of the first logical processor based, at least in part, on the first relative performance bias value indicating a first performance preference that is higher than a second performance preference.

25 Claims, 23 Drawing Sheets

(52) U.S. Cl.
CPC .......... *G06F 9/5044* (2013.01); *G06F 9/3009* (2013.01); *G06F 2209/501* (2013.01)

(58) Field of Classification Search
USPC .................................................. 718/102, 104
See application file for complete search history.

(56) References Cited

U.S. PATENT DOCUMENTS

| | | | |
|---|---|---|---|
| 5,826,082 | A | 10/1998 | Bishop et al. |
| 6,567,839 | B1 | 5/2003 | Borkenhagen et al. |
| 7,509,643 | B2 | 3/2009 | Qiu et al. |
| 8,095,932 | B2 | 1/2012 | Merten et al. |
| 8,402,253 | B2 | 3/2013 | Merten et al. |
| 8,521,993 | B2 | 8/2013 | Marden et al. |
| 8,799,902 | B2 | 8/2014 | Illikkal et al. |
| 2003/0023835 | A1 | 1/2003 | Kalafatis et al. |
| 2003/0233394 | A1 | 12/2003 | Rudd et al. |
| 2004/0194094 | A1 | 9/2004 | Qiu et al. |
| 2005/0021931 | A1 | 1/2005 | Anderson et al. |
| 2005/0125789 | A1 | 6/2005 | Dijkstra et al. |
| 2006/0069874 | A1 | 3/2006 | Desai |
| 2008/0040554 | A1 | 2/2008 | Zhao et al. |
| 2008/0075101 | A1 | 3/2008 | Illikkal et al. |
| 2008/0162868 | A1 | 7/2008 | Glew |
| 2008/0250233 | A1 | 10/2008 | Marden et al. |
| 2009/0049446 | A1 | 2/2009 | Merten et al. |
| 2009/0055833 | A1* | 2/2009 | Hall .................... G06F 11/3419 718/104 |
| 2011/0055524 | A1 | 3/2011 | Marden et al. |
| 2011/0055525 | A1 | 3/2011 | Marden et al. |
| 2011/0296212 | A1* | 12/2011 | Elnozahy .............. G06F 1/3203 713/320 |
| 2014/0053009 | A1* | 2/2014 | Semin ................. G06F 9/30083 713/322 |
| 2017/0161106 | A1 | 6/2017 | Marden et al. |

OTHER PUBLICATIONS

Cazorla et al., "QoS for High-Performance Smt Processors in Embedded Systems", IEEE Computer Society, 2004, pp. 24-31.
Office Action and Search Report for Chinese Patent Application No. 200810213212.2 dated May 9, 2013, 17 Pages of Office action including English Translation.
Office Action and Search Report for Chinese Patent Application No. 201010624670.2 dated Mar. 5, 2013, 14 Pages of Office action including English Translation.
Office Action for Chinese Patent Application No. 200810213212.2 dated Jan. 30, 2012, 12 Pages of Office action including English Translation.
Office Action for Chinese Patent Application No. 200810213212.2 dated Jun. 9, 2010, 11 Pages of Office action including English Translation.
Office Action for Chinese Patent Application No. 200810213212.2 dated Jun. 26, 2012, 14 Pages of Office action including English Translation.
Office Action for Chinese Patent Application No. 201010624670.2 dated Jul. 10, 2014, 8 Pages of Office action including English Translation.
Office Action for Chinese Patent Application No. 201010624670.2 dated Nov. 21, 2013, 12 Pages of Office action including English Translation.
State Intellectual Property Office of the People's Republic of China, First Office Action and Search Report issued in CN Patent Application No. 201510182451.6, dated Dec. 2, 2016; 23 pages including English translation.
State Intellectual Property Office of the People's Republic of China, Second Office Action issued in CN Patent Application No. 201510182451.6, dated Jul. 4, 2017; 14 pages including English translation.
State Intellectual Properly Office of the People's Republic of China, Third Office Action issued in CN Patent Application No. 201510182451.6, dated Jan. 2, 2018; 10 pages, English translation only.

* cited by examiner

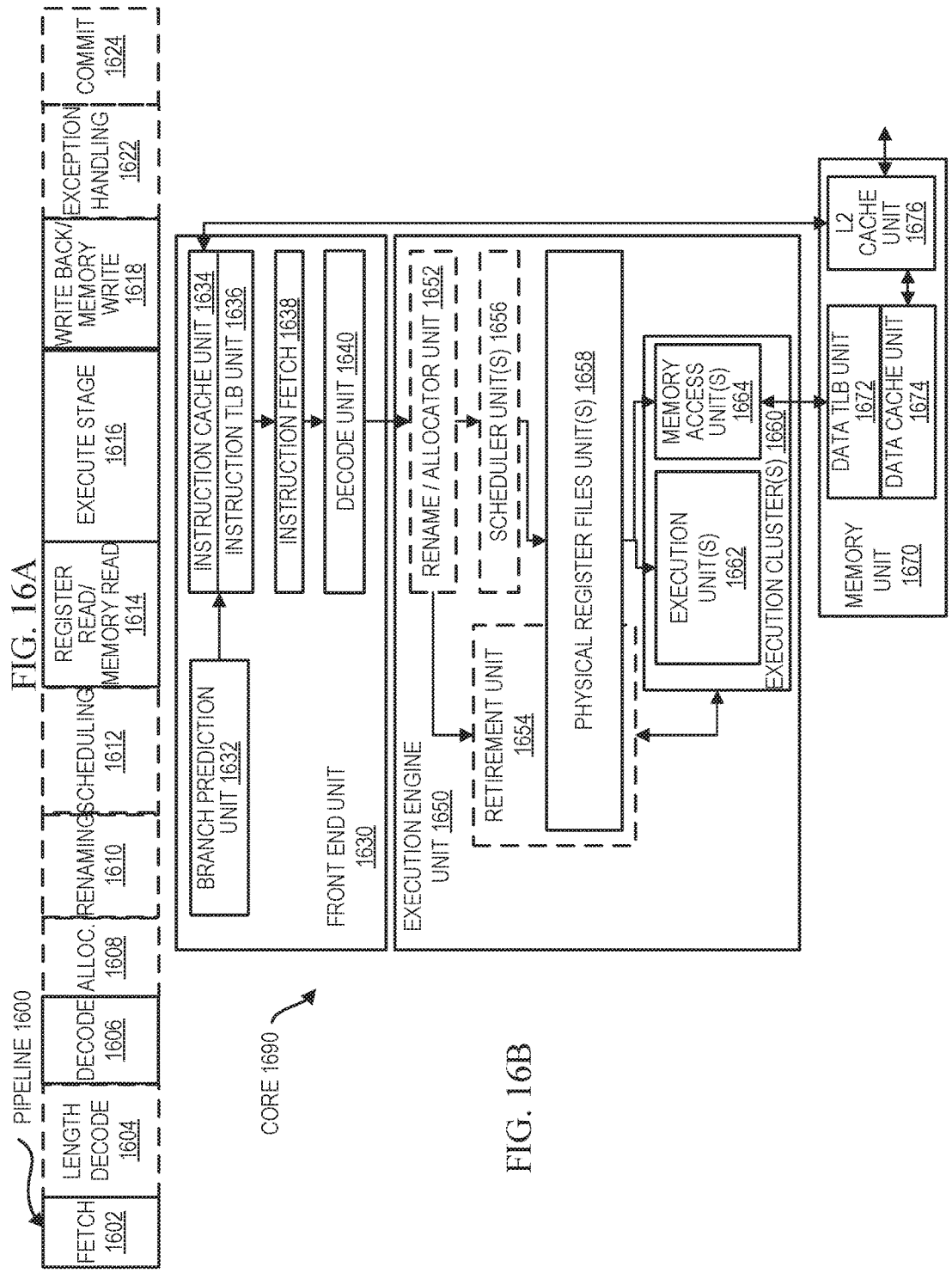

DYNAMIC PERFORMANCE BIASING IN A PROCESSOR

TECHNICAL FIELD

This disclosure relates in general to the field of computing architectures, and more particularly, to a dynamic performance biasing in a processor.

BACKGROUND

Simultaneous multithreading (SMT) is a processing technique employed by superscalar computer processing units (CPUs) with hardware multithreading. SMT enables multiple threads to run simultaneously on logical processors of the same physical core in a CPU. Instructions are fetched from multiple threads in each execution cycle. This can be achieved by sharing different pipeline resources of the core. Fetched instructions from multiple threads can be executed or handled by any pipeline stage during the same cycle. Generally, the sharing of hardware resources is unbiased and thus, such resources are equally shared among threads executing simultaneously. Similarly, execution cycles are typically divided equally among all the logical processors on an SMT core. As computer architectures evolve, continuous efforts are made to further increase efficiency and optimize performance of processing elements.

BRIEF DESCRIPTION OF THE DRAWING

To provide a more complete understanding of the present disclosure and features and advantages thereof, reference is made to the following description, taken in conjunction with the accompanying figures, where like reference numerals represent like parts, in which:

FIG. 16A is a block diagram illustrating both an exemplary in-order pipeline and an exemplary register renaming, out-of-order issue/execution pipeline in accordance with certain embodiments;

FIG. 16B is a block diagram illustrating both an exemplary embodiment of an in-order architecture core and an exemplary register renaming, out-of-order issue/execution architecture core to be included in a processor in accordance with certain embodiments;

DETAILED DESCRIPTION OF EMBODIMENTS

Figure 1:
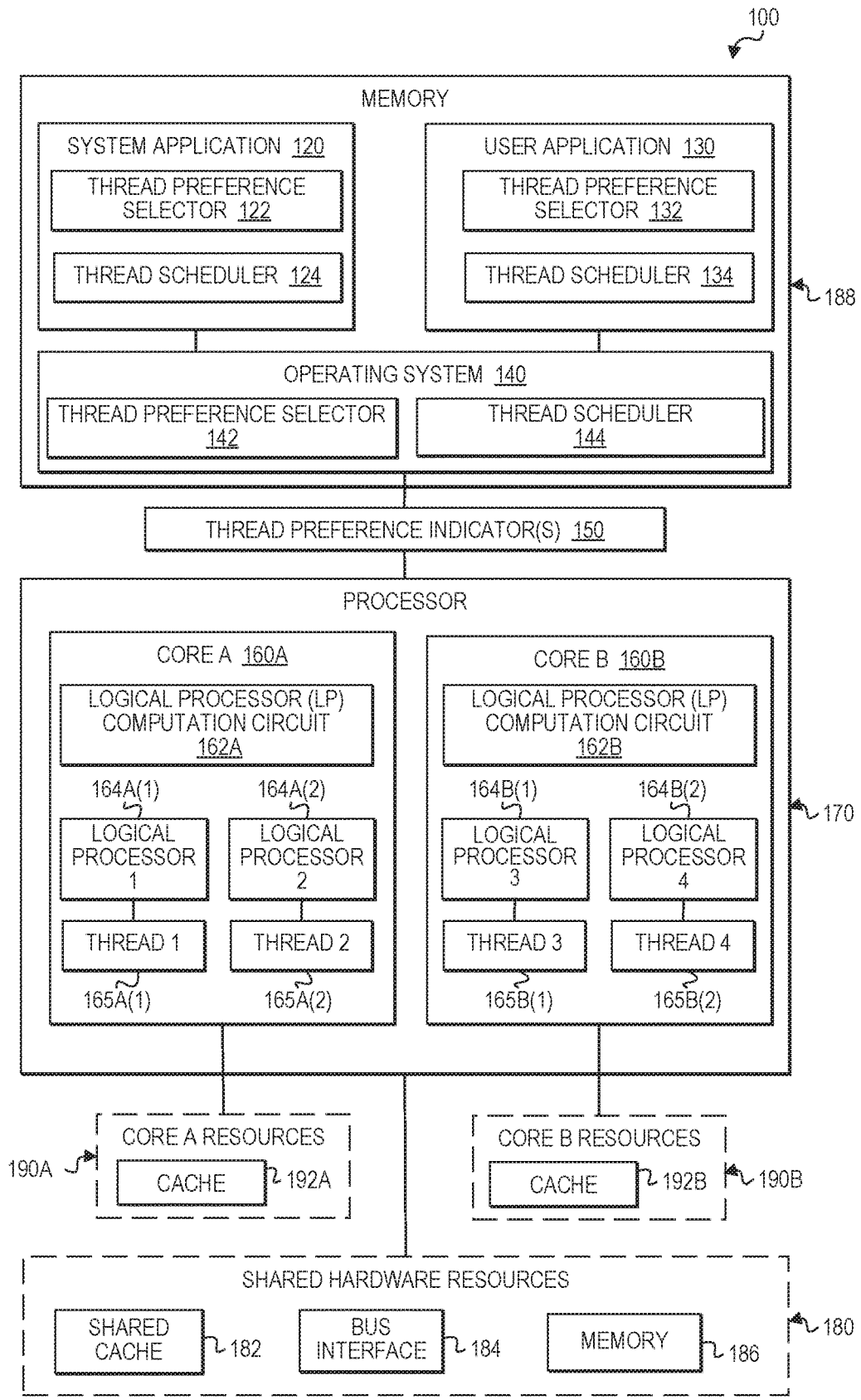
FIG. 1 is a simplified block diagram of a computing system for dynamic performance biasing of logical processors in accordance with certain embodiments.

The following disclosure provides various possible embodiments, or examples, for implementing features disclosed in this specification. These features are related to a computing system for dynamic performance biasing based on thread characteristics. Dynamic performance biasing can be implemented with hardware and software. Hints can be provided to the computing system hardware by various actors, where the hints indicate performance preferences for particular threads or logical processors associated with the threads. Such actors can include, but are not necessarily limited to, an operating system, system applications, user applications, and/or settings changed by users. Hints can be provided in the form of a special setting or thread preference indicator programmed for a thread. Thread preference indicators can be used to compute a relative performance bias value for each logical processor associated with a thread for which a thread preference indicator was provided. Resources can be dynamically and efficiently allocated and/or divided based on one or more computed performance bias values.

In other embodiments, other types of performance bias values may be computed and used to dynamically bias other types of components during processing. For example, in a multicore processor architecture, core relative performance biases may be computed from thread preference indicators, and used to dynamically allocate resources that are shared among the cores. In at least some embodiments, a multicore processor may be configured for concurrent dynamic core performance biasing of resources that are shared among the cores and dynamic logical processor performance biasing of resources that are shared among the logical processors of a core. In yet further embodiments, in a multi-socketed architecture, processor performance bias values of processors may be computed from thread preference indicators and potentially core performance bias values. The processor performance bias values can be used to dynamically allocate resources that are shared among the processors. In at least some embodiments, a multicore processor may be configured for performing dynamic processor performance biasing of resources that are shared among the processors concurrently with dynamic core performance biasing of resources that are shared among the cores of a processor and/or dynamic logical processor performance biasing of resources that are shared among the logical processors of a core.

For purposes of illustrating certain example techniques of a computing system for dynamic logical processor performance biasing and other performance biasing (e.g., core, processor), it is important to understand the activities that may be occurring in such systems with multiple threads executing simultaneously and the computer system enabled to provide indications of performance preferences for threads of an application. The following foundational information may be viewed as a basis from which the present disclosure may be properly explained. For ease of reference, it should be noted that 'dynamic performance bias' is also referred to herein as 'performance bias,' as it is understood that any such biasing is performed dynamically.

Simultaneous multithreading (SMT) enables multiple threads to run simultaneously on logical processors of the same physical core. When executed, an application may instantiate numerous threads with varying degrees of importance or criticality to the application. Although SMT enables greater efficiency than other types of multithreading such as block and interleaved multithreading, typically, hardware has not had the capability to follow actual operating system and software biasing needs or preferences and, therefore, hardware has only been able to estimate a relative performance.

At least one new technology, namely Intel® Speed Shift technology offered by Intel Corporation, however, enables applications to provide indications, or hints, to the hardware indicating an energy performance preference for a logical processor in an SMT core. In this particular technology, hints may be provided through an Energy Performance Preference (EPP) field in IA32_HWP_REQUEST MSR register per logical processor. The EPP field, however, is used to compute overall performance state of all cores in a domain, and threads running on the same core are treated equally. Thus, logical processors that are associated with important or even critical threads are unable to leverage a core design and SMT to enhance or optimize performance when needed most by an application.

Currently, resources within an SMT core are shared unbiased among all logical processors. Generally, each logical processor gets an equal share of the core resource and an equal share of the portion of a shared resource allocated to the core. Without software assistance, hardware allocates a resource for each logical processor based on hardware control flows, which can result in equal allocation of the resource. For example, hardware does not provide any preference to a logical processor in different pipeline stages.

In addition, the share of each of the core units (e.g., core-level cache, shared cache, buses, memory resources such as preacher, access ports, internal registers, other out of order microarchitecture features, etc.) are used equally by different logical processors running on the same core. Execution cycles are also equally divided among all logical processors on a core. Furthermore, pipeline components run at the same speed, which is dynamically increased or decreased as and when needed, but is not adjusted based on a performance preference of a particular thread. Such components include, but are not necessarily limited to, a decoder unit, a renaming unit, an allocator unit, a scheduler unit, an execution unit, and/or a memory access unit. Additionally, in some microarchitectures, thread scheduling on the core pipeline is divided among a core's threads. Hardware scheduling tries to allocate the same amount of compute resources for all the hardware core's threads.

Turning to FIG. 1, embodiments of a computing system 100 configured for logical processor (LP) performance biasing can resolve the aforementioned issues (and more) associated with computing systems with one or more simultaneous multithreading cores. Example computing system 100 can include one or more system applications (e.g., 120), one or more user applications (e.g., 130), and an operating system 140, any or all of which may be stored in memory 188. System and user applications may include thread preference selectors (e.g., 122, 132, 142) and thread schedulers (e.g., 124, 134, 144). Thread preference indicators 150 can be stored in any suitable storage or memory, such as a hardware register, and may be obtained by a processor 170. Cores, such as core A 160A and core B 160B, of processor 170 can each include a logical processor (LP) computation circuit (e.g., 162A, 162B), and multiple logical processors (e.g., 164A(1), 164A(2), 164B(1), 164B(2)) with respective threads (e.g., 165A(1), 165A(2), 165B(1), 165B(2)). Core-specific hardware resources such as core A resources 190A and core B resources 190B can include, for example, core-specific caches (e.g., 192A, 192B). Shared hardware resources 180 can be shared among cores and can include shared cache 182, bus interface 184, and memory 186. In at least one embodiment, memory 188 is part of memory 186, which may be a main memory (e.g., random access memory (RAM)), for computing system 100. Not shown in FIG. 1 is storage (e.g., hard disk, solid state drives, etc.) that can be provisioned in computing system 100 for storing data and code. Other shared hardware resources to which performance biasing may be applicable could include, but are not necessarily limited to internal registers, access ports, out of order microarchitecture features, etc.

Embodiments of computing system 100 can leverage diversity of thread preference information across different logical processors in the same SMT core (e.g., 160A, 160B) and enhance resource sharing across logical processors within the core based on thread performance preferences (also referred to herein as 'thread preferences'). In one example, thread preference information of logical processors in an SMT core may be based on Intel® Speed Shift Energy Performance Preference (EPP) setting. It should be appreciated, however, that any suitable technology, whether currently available or subsequently developed, that is capable of providing thread preference information (e.g., in the form of a thread preference indicator) per logical processor can be leveraged by hardware to manage resources efficiently among logical processors within an SMT core and to provide performance to the associated application where it is most needed.

In an embodiment, a core reads a respective thread preference indicator 150 for each logical processor of that core. Thread preference indicators can be programmed, configured, or otherwise set by a user application, operating system, system application, or user, for example. In at least some embodiments, the operating system enables the thread preference indicator (which may be set by a user application, system application, user, or operating system) to be suitably stored, for example, in a hardware register. Thread preference indicators may be based on the thread characteristics (e.g., priority, importance, utilization, etc.) of the threads running on the logical processors and the importance of the logical processors to the associated application. Additionally, the priority or importance of an application itself may also be considered when thread preference indicators are programmed. The core consolidates the thread preference indicators assigned to its logical processors and computes a relative performance bias value for each logical processor, based on the relativeness of the thread preference indicators. These relative performance bias values represent the proportion of the performance bias needed for each logical processor. The hardware adjusts the performance bias for each logical processor based on the relative performance bias value for that logical processor. More specifically, the hardware can dynamically adjust core hardware resource usage, shared hardware resource usage, execution cycles, and speed (i.e., utilization) of different components in the pipeline stages for each logical processor.

A computing system for performance biasing across logical processors within a core, such as computing system 100, can provide several advantages. Hardware can leverage thread preference information diversity to manage resources efficiently among logical processors within an SMT core and to enhance performance of an associated application where it is most needed. By using the per logical processor thread preference information, hardware can opportunistically bias performance of a logical processor in an SMT core. For example, a logical processor running a thread programmed with a higher performance preference (e.g., high priority thread such as downloading or uploading in a file transfer application), as indicated by the thread's thread preference indicator, can be given a greater share of hardware resources, execution cycles, and/or component speed as compared to another logical processor running a thread programmed with a lower performance preference (e.g., low priority thread such as downloading or uploading in the background of a user-interactive application), as indicated by that thread's thread preference indicator. Conversely, a logical processor running a thread programmed with a lower performance preference (e.g., low priority or less important thread), as indicated by the thread's thread preference indicator, can be given a lesser share of hardware resources, execution cycles, and/or component speed as compared to another logical processor running a thread programmed with a higher performance preference (e.g., high priority or more important thread), as indicated by that thread's thread preference indicator.

In at least one embodiment, hardware can leverage thread preference indicators across different logical processors within a core by computing a logical processor (LP) performance bias value for each logical processor and biasing resource availability and performance to the logical processor(s) with the highest (LP) performance bias value. A logical processor performance bias value for a particular logical processor can be computed based on the thread preference indicator associated with that logical processor relative to the thread preference indicators associated with the other logical processors in the same core. This approach can result in better responsiveness and application experience.

A brief discussion is now provided about some of the possible infrastructure that may be included in computing system 100. Multiple types of software components may be provided on computing system 100. For example, system application 120, user application 130, and operating system 140 are all examples of software provisioned on computing system 100. Each of the software components may be provided with a thread preference selector (e.g., 122, 132, and 142). In at least one embodiment, thread preference selectors can be implemented as software that allows an operating system, a system or user application, and/or a user of an application to select and program, configure, or otherwise set thread preference indicators 150 for threads associated with the application. In at least one embodiment, a single thread preference indicator may be set for each thread of an application to indicate the thread's performance preference.

In at least one embodiment, thread preference indicators 150 may be stored in any suitable storage structure including, but not limited to, a machine state register (MSR), a control register (e.g., general or specific), a configuration register, or a status register. In one possible non-limiting example, the thread preference indicators may be stored in an Energy Performance Preference field in IA32_HWP_REQUEST_MSR register per logical processor. In this nonlimiting example, each thread preference indicator may be selected as a value between 0-255, where the lower the value is, the higher the performance preference is. For example, a thread preference indicator of 10 has a higher performance preference than a thread preference indicator of 100, which has a higher performance preference than a thread preference indicator of 200. In other embodiments, thread preference indicator may be stored for at least some period of time in memory such as cache.

In at least some embodiments, thread preferences of an application may be selected and set by a single software component such as system application 120, user application 130, operating system 140, or a user of an application. In other embodiments, however, thread preferences can be selected and set by multiple software components such as user application 130 and operating system 140, for example. In these embodiments, some coordination may occur, for example, in hardware of the appropriate core where the threads are running (e.g., core A 160A, core B 160B) or in operating system software (e.g., operating system 140). In an example scenario, if a first thread preference indicator is set by user application 130 and a second thread preference indicator is set by operating system 142, then hardware (e.g., LP computation circuit 162A or 162B of respective cores 160A and 160B) or software (e.g., thread preference selector 142 of operating system 140), may be invoked to determine which thread preference indicator is to be applied to the associated logical processor.

Software components of computing system 100 may also include thread schedulers (e.g., 124, 134, 144) to maximize leverage of a thread preference of a thread by intelligently assigning the thread to a logical processor of a core, such that the assignment creates diversity in the thread preferences associated with the core. For example, a thread may be assigned to a core in which the thread will have the highest performance preference relative to performance preferences of other threads running in the core. This can ensure that logical processors associated with higher performance preferences receive greater shares of resources, execution cycles, and component utilization of an SMT core versus using the same amount of an SMT core among logical processors where no diversity is present.

In at least some embodiments, threads of an application can be intelligently assigned to logical processors by a single software component such as thread scheduler 124 of system application 120, thread scheduler 134 of user application 130, or thread scheduler 144 of operating system 140. In other embodiments, however, hardware may be used to intelligently assign threads to logical processors.

In one example implementation for creating diversity in thread preference indicators associated with logical processors in a core, a bit can be set (e.g., via CPU ID bits) so that an application can discover this leveraging capability. An application with a thread scheduler can keep track of thread preference indicators of all logical processors in the cores of the system. When a new thread or work is to be scheduled on a logical processor, the thread scheduler can determine which cores have logical processors with different thread preference indicators as compared to the new thread or work. If multiple cores have logical processors associated with different thread preference indicators, then the new thread can be scheduled on a core that yields maximum diversity of the thread preference indicators and/or that causes the new thread to have the highest performance preference relative to performance preferences of other threads running in that core.

Computing system 100 illustrates processor 170, which is a simultaneous multithreading, multicore processor. Examples of logical processors and threads are shown in FIG. 1 for illustrative purposes. Logical processor 1 164A(1) with thread 1 165A(1) and logical processor 2 164A(2) with thread 2 165A(2) are shown in core A 160A. Logical processor 3 164B(1) with thread 3 165B(1) and logical processor 4 164B(2) with thread 4 165B(2) are shown in core B 160B. It should be apparent, however, that embodiments could be implemented in a single core processor or a multicore processor with more than two cores. Furthermore, any number of logical processors could be running (or could be idle) on the cores at any given time.

In at least one embodiment, a core (e.g., cores A and B) may contain hardware, such as an LP computation circuit (e.g., 162A or 162B), that performs one or more operations to compute a relative performance bias value for each logical processor in the core and to adjust the resources, execution cycles, and/or component speeds allocated to each logical processor, if needed, based on the respective computed performance bias values. Thus, the hardware in a core can bias performance of logical processors within the core based on thread preference indicators. To achieve this performance biasing, the LP computation circuit (e.g., 162A or 162B) in a core may be configured to obtain thread preference indicators 150 associated with threads assigned to logical processors in the core. An LP computation circuit can obtain a thread preference indicator by reading, receiving, being provided, or otherwise gaining access to the thread preference indicator. The relativeness of the thread preference indicators can be used to compute a logical processor relative performance bias (LP-RPB) value for each logical processor.

For a logical processor in the core, an LP-RPB value can be computed based on the thread preference indicator of the logical processor relative to the other thread preference indicators of the other logical processors in the core. For a particular logical processor, one example calculation could include the following: LP-RPB value=Max(thread preference indicator in core)/(SUM(thread preference indicators in core) Minimal allocation value). Based on the calculated LP-RPB values, the LP computation circuit or other hardware in the core can then dynamically adjust hardware resource usage, a number of execution cycles, and/or speed of different components in the pipeline stages for each logical processor of the core based on its respective LP-RPB value. The LP computation circuit can be further configured to monitor thread preference indicator changes and logical processor changes (e.g., becoming idle, becoming active) and dynamically updating resource allocation, the number of execution cycles, and component speed in the pipeline stages.

In embodiments described herein, hardware resource usage can be dynamically adjusted by hardware (e.g., 162A, 162B). For example, hardware can allocate or distribute hardware resources based on the performance preferences of the logical processors in the same core. In one example, the hardware resources may be distributed proportionally among the logical processors based on the computed LP-RPB values. Hardware resources can include core-specific resources, such as core A resources 190A and core B resources 190B, and shared hardware resources 180. Specific examples of hardware resources that can be dynamically adjusted include, but are not limited to, core-specific cache, shared cache, shared buses, and shared memory. Core-specific resources can be allocated to and used by logical processors of a single core. For example, shares of cache 192A can be dynamically adjusted and allocated to logical processors 164A(1) and 164A(2), and shares of cache 192B can be dynamically adjusted and allocated to logical processors 164B(1) and 164B(2). Shared hardware resources 180 can be allocated to logical processors across multiple cores. For example, respective shares of memory 186 may be allocated to core A 160A and core B 160B. The share of memory allocated to core A can be used to dynamically allocate subsets of the share to logical processors 164A(1) and 164A(2) based on their respective LP performance bias values. The share of memory allocated to core B can be used to dynamically allocate subsets of the share to logical processors 164B(1) and 164B(2) based on their respective LP performance bias values.

In embodiments described herein, the number of execution cycles of logical processors could be dynamically adjusted by hardware (e.g., 162A, 162B) based on thread preferences. An execution cycle is the time period during which one instruction in a thread is fetched from memory and executed. In one example, the execution cycles may be proportionally divided among the logical processors based on the computed LP-RPB values. For example, hardware could dynamically assign a logical processor with a higher performance preference more execution cycles on the core as compared to logical processors with lower performance preference. Conversely, hardware could dynamically assign a logical processor with a lower performance preference fewer execution cycles on the core as compared to logical processors with higher performance preferences.

In embodiments described herein, hardware (e.g., 162A, 162B) can give a logical processor with a higher performance preference, as compared to other threads running on the same core, more preference in different pipeline stages. Pipeline stages can include, for example, fetching, decoding, allocating, renaming, scheduling, register/memory reading, executing, writing, exception handling, and committing. At least some pipeline stages include certain components for which utilization can be adjusted based on thread preferences. Increasing utilization of a component can increase the speed of the component and conversely, decreasing utilization of a component can decrease the speed of the component. In particular, hardware can provide an extra boost (e.g., utilization) to a component of a pipeline stage that is executing or handling a logical processor with a higher performance preference compared to other logical processors in the same core. Pipeline stages and components will be shown and discussed in more detail herein with reference to FIGS. 16A-16B.

Embodiments herein may be implemented using any suitable way of achieving desired performance biasing among logical processors in a core. In one example, shares of hardware resources and execution cycles may be distributed proportionally among the logical processors of a core based on the computed LP-RPB values. LP-RPB values can be computed in various ways based on a relativeness of thread preference indicators across logical processors in the core. The 'relativeness' of thread preference indicators, as used herein, is intended to mean a relation, connection, or dependence of the thread preference indicators on each other. Accordingly, when computing an LP-RPB value of a logical processor, the computing is based on a thread preference indicator of the thread of that logical processor being considered, evaluated, ordered, compared, etc., in relation to other thread preference indicators of the other threads in the core. For example, for LP-RPB values computed based on thread preference indicators having significantly different performance preference levels (e.g., 10 and 255), shares of hardware resources and execution cycles could each be allocated among the logical processors and have a wider proportional difference than if the thread preference indicators indicated less diverse performance preference levels (e.g., 10 and 20). In another example, predetermined percentage distributions may be used. For example, for three logical processors in a core having diverse thread preference indicators, hardware resources and execution cycles may be divided among the logical processors by predetermined percentages (e.g., 60-30-10 percentages) that correspond to the logical processors ordered according to thread preference indicators (e.g., highest to lowest performance preferences). In another example, for three logical processors having diverse performance preferences, hardware resources and execution cycles may be divided among the logical processors by predetermined percentages (e.g., 60-20-20 or 40-40-20 percentages) that provide greater increased bias for only the logical processor associated with the thread preference indicator that indicates the highest performance preference (e.g., thread preference indicator of 0) and/or that provide greater decreased bias for only the logical processor associated with the thread preference indicator that indicates the lowest performance preference (e.g., thread preference indicator of 255).

Figure 2:
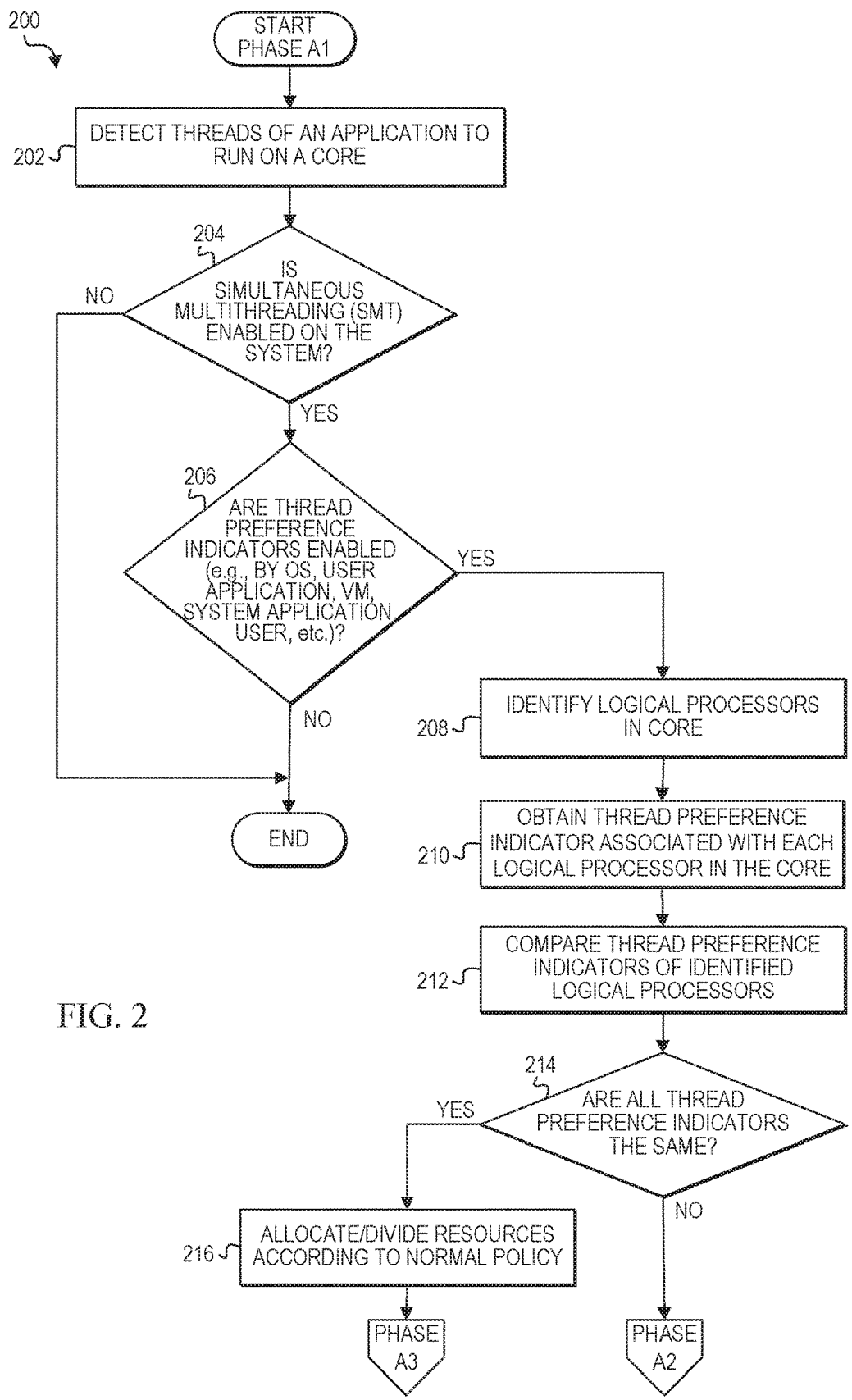
FIG. 2 is a simplified flowchart of potential operations associated with dynamic performance biasing of logical processors in accordance with certain embodiments.

FIG. 2 is a simplified flowchart of possible operations that may be associated with an embodiment of logical processor performance biasing in computing system 100. For ease of illustration, logical processor performance biasing is described in three phases, and FIG. 2 represents Phase A1. In at least one embodiment, a set of operations corresponds to activities of FIG. 2. An SMT core (e.g., core A 160A, core B 160B), or a portion thereof, may utilize the set of operations. The SMT core may comprise means, such as hardware, for performing the operations. In one example, at least some of the operations shown in flow 200 may be performed by LP computation circuit 162A or 162B, depending on the core where the threads are assigned to logical processors. For ease of reference, FIG. 2 will be further described herein assuming that threads of an application are to be assigned to logical processors 164A(1) and 164A(2) of core A 160A.

Phase A1 identifies whether an application uses thread preference indicators and whether the application, operating system, or user has programmed different thread preference indicators for threads to run on logical processors in an SMT core (e.g., core A 160A). At 202, threads of an application to run on a core (e.g., core A 160A) are detected. At 204, a determination can be made as to whether simultaneous multithreading is enabled on the core. If SMT is not enabled, then the flow ends. If SMT is enabled on the core, then at 206, a determination is made as to whether thread preference indicators are enabled for the threads of the application. For example, a thread preference indicator bit may be set by a component (e.g., operating system, user application, system application, virtual machine, user, etc.) if that component has employed the use of thread preference indicators to set thread preferences for the threads of the application.

If thread preference indicators are enabled as determined at 206 (e.g., thread preference indicator bit is set), then at 208, the all logical processors in the care are identified (e.g., 164A(1) and 164A(2)). At 210, thread preference indicators of all threads running on the identified logical processors of the core are obtained. In one non-limiting example, the values of the thread preference indicators can range from 0 to 255, where 0 assigned to a first thread indicates the most preference towards performance is to be given to the first thread, and 255 assigned to a second thread indicates the least preference towards performance is to be given to the second thread. In at least one example, threads may be assigned any value from 0 to 255 to indicate a particular level of performance preference to be given.

At 212, the thread preference indicators of the identified logical processors are compared. At 214, a determination is made as to whether all thread preference indicators of threads belonging to the same core have the same value. If the thread preference indicators of threads belonging to the same core all have the same value, then at 216, resources are allocated and divided among the identified logical processors according to normal policies of the system. Flow passes to Phase A3, as described in FIG. 5, to monitor changes to thread preference indicators and logical processors of the core. If a determination is made, at 214, that at least one different value is present among the thread preference indicators of threads belonging to the same core, then flow passes to Phase A2, as described in FIG. 3.

Figure 3:
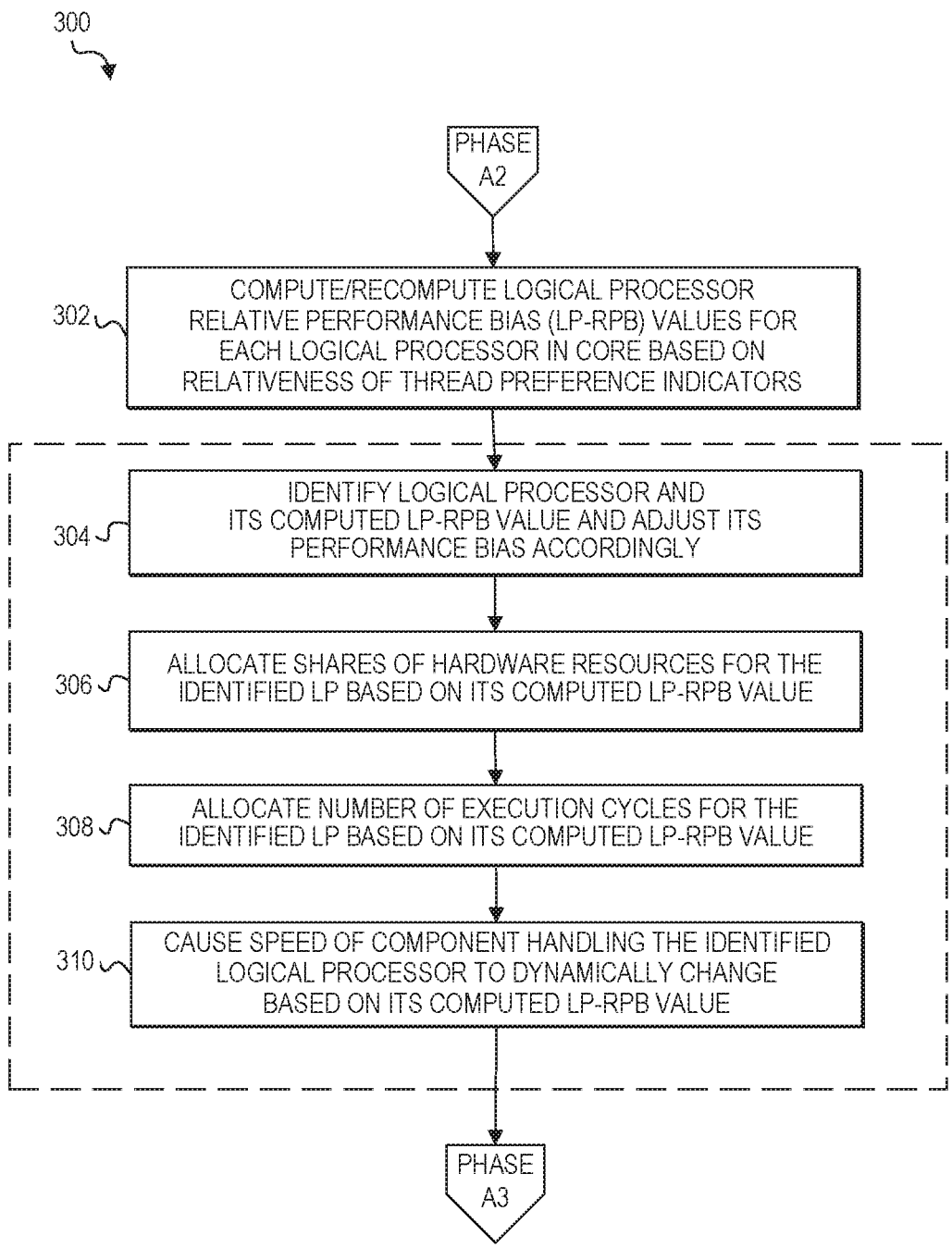
FIG. 3 is a simplified flowchart of further potential operations associated with dynamic performance biasing of logical processors in accordance with certain embodiments.

FIG. 3 is a simplified flowchart of possible operations that may be associated with an embodiment of logical processor performance biasing in computing system 100. FIG. 3 represents Phase A2 of logical processor performance biasing. In at least one embodiment, a set of operations corresponds to activities of FIG. 3. An SMT core (e.g., core A 160A, core B 160B), or a portion thereof, may utilize the set of operations. The SMT core may comprise means, such as hardware, for performing the operations. In one example, at least some of the operations shown in flow 300 may be performed by LP computation circuit 162A or 162B, depending on the core where the threads are assigned to logical processors. For ease of reference, FIG. 3 will be further described herein assuming that the threads of the application are assigned to logical processors 164A(1) and 164A(2) of core A 160A.

In Phase A2, at 302, logical processor (LP) relative performance bias values are computed based on the relativeness of the thread preference indicators across logical processors in an SMT core (e.g., core A 160A). Specifically, an LP relative performance bias (LP-RPB) value can be computed for a logical processor within a core based on the relativeness of a thread preference indicator of a thread assigned to that logical processor and thread preference indicators of threads assigned to other logical processors within the same core. Relativity can be computed based on the values of the thread preference indicators. In one example, the relativeness of thread preference indicators is used to compute proportional values of the thread preference indicators based on their level of performance preference. For example, if thread preference indicators have values in the range of 0-255, as previously described herein, then the proportional value can vary based on the particular level of performance preference. So, thread preference indicators of 10, 200, and 250 could have different proportions than thread preference indicators of 10, 50, and 225, for example. In at least one implementation, LP-RPB values may be computed based on the proportions (e.g., as percentages).

In another implementation, the relativeness of thread preference indicators may be used to determine an order of logical processors in a core based on performance preferences (e.g., highest to lowest) indicated by the thread preference indicators of threads assigned to those logical processors. In this implementation, LP-RPB values may be based on predetermined proportions for the ordered logical processors. For example, three logical processors in core A may be ordered based on thread preference indicators of 0, 100, and 200 of threads assigned to the three logical processors in core A. Three logical processors in core B may be ordered based on thread preference indicators of 25, 50, and 255 of threads assigned to the three processors in core B. In each of these scenarios, LP-RPB values computed for the three logical processors in each core could be based on the same predetermined proportions (e.g., 50-30-20 percentages) regardless of the particular values of thread preference indicators associated with each core.

In yet another example, relativeness of the thread preference indicators may be used to distinguish the thread preference indicator that represents the highest performance preference of a logical processor in the core. For example, the LP-RPB values computed for logical processors in a core may be equivalent, except for the LP-RPB value for the logical processor associated with the highest performance preference as indicated by the thread preference indicator. The LP-RPB value for the logical processor associated with the highest performance preference may be greater than the other LP-RPB values. For example, three LP-RPB values computed for three logical processors having thread preference indicators of 10, 200 and 255 could be based on predetermined proportions (e.g. 50-25-25 percentages), where the LP-RPB value for the logical processor having the highest performance preference (e.g., thread preference indicator 10) is the highest proportion (e.g., 50 percent). The LP-RPB values for the remaining logical processors may be the same lower proportion (e.g., 25 percent each). It should be appreciated that relativeness of the thread preference indicators may also (or alternatively) be used to distinguish a thread preference indicator that represents the lowest performance preference of a logical processor in the core.

Although several examples have been described above, generally, any desired performance biasing among logical processors of the same core may be implemented based on diverse thread preference indicators associated with the logical processors, and LP-RPB values can be computed accordingly to achieve the desired biasing. Moreover, in some embodiments, a single LP-RPB value may be computed to accomplish performance biasing of resources, execution cycles, and component speed in a logical processor. In other embodiments, however, unique LP-RPB values may be computed to apply to each one of (or any combination of) hardware resources, execution cycles, and component speeds in a logical processor. Furthermore, it should be appreciated that the LP-RPB values may not necessarily be expressed as percentages but may be expressed in any suitable form that can be used to determine the amount of resources, execution cycles, or utilization to be allocated for each logical processor.

Operations 304-312 may be performed, as needed, for each logical processor in the core while the associated threads are running. The performance bias of each logical processor can be adjusted, if needed, based on its computed LP-RPB value. Generally, if a logical processor on a core has a higher relative performance bias, then the logical processor is given a greater share on the core pipeline, including a greater utilization of a pipeline component handling the logical processor, a greater number of execution cycles than other logical processors are given, and a greater share of hardware resources than the shares allocated to other logical processors. The share of hardware resources can include a greater share of core-specific hardware resources and potentially a greater share of the portion of shared hardware resources allocated to that core.

At 304, a logical processor (e.g., logical processor 1 164A(1)) and its computed LP-RPB are identified. A logical processor can be identified for dynamically adjusting its performance bias, as and when needed, based on hardware resources needing to be allocated (e.g., hardware resources are requested),execution cycles needing to be divided among logical processors (e.g., new thread scheduled), and/or initiation of a pipeline component to handle the logical processor. The performance bias of the identified logical processor can be adjusted (e.g., increased or decreased), if needed, based on the LP-RPB value computed for the logical processor.

Adjusting the performance bias of the identified logical processor is performed in 306-310. At 306, shares of one or more hardware resources are allocated for the identified logical processor based on the LP-RPB computed for that logical processor. Hardware resources to be allocated can include core-specific hardware resources (e.g., core A resources 190A) and/or shared hardware resources (e.g., 180). If the identified logical processor has an LP-RPB value that indicates a higher performance preference for the identified logical processor as compared to all other logical processors in the same core (e.g., logical processor 2 164A(2)), then a greater share of hardware resources is allocated for the identified logical processor. Conversely, if the identified logical processor has an LP-RPB value that indicates a lower performance preference for the identified logical processor as compared to all other logical processors in the same core (e.g., logical processor 2 164A(2)), then a lesser share of hardware resources is allocated for the identified logical processor. Finally, the identified logical processor may have an LP-RPB value that indicates the performance preference for the logical processor is higher than one or more logical processors in the same core but lower than one or more other processors in the same core. In this scenario, the share of hardware resources allocated to the identified logical processor may be greater than shares allocated for logical processors with lower performance preferences in the same core and less than shares allocated for logical processors with higher performance preferences in the same core.

At 308, a number of execution cycles are given to the identified logical processor based on the LP-RPB value computed for that logical processor. If the identified logical processor has an LP-RPB value that indicates a higher performance preference for the identified logical processor as compared to all other logical processors in the same core (e.g., logical processor 2 164A(2)), then a greater number of execution cycles are allocated for the identified logical processor. Conversely, if the identified logical processor has an LP-RPB value that indicates a lower performance preference for the identified logical processor as compared to all other logical processors in the same core (e.g., logical processor 2 164A(2)), then a lesser number of execution cycles is allocated for the identified logical processor. Finally, the identified logical processor may have an LP-RPB value that indicates the performance preference for the logical processor is higher than one or more logical processors in the same core but lower than one or more other logical processors in the same core. In this scenario, the number of execution cycles allocated to the identified logical processor may be greater than the number of execution cycles allocated for logical processors with lower performance preferences in the same core and less than the number of execution cycles allocated for logical processors with higher performance preferences in the same core.

At 310, the speed of one or more components executing or otherwise handling the identified logical processor may be dynamically changed based on the LP-RPB value computed for that logical processor. If the identified logical processor has an LP-RPB value that indicates a higher performance preference for the identified logical processor as compared to all other logical processors in the same core (e.g., logical processor 2 164A(2)), then the utilization of a pipeline component handling the logical processor may be dynamically increased and, therefore, cause the speed of the component to increase. Conversely, if the identified logical processor has an LP-RPB value that indicates a lower performance preference for the identified logical processor as compared to all other logical processors in the same core (e.g., logical processor 2 164A(2)), then the utilization of a pipeline component handling the logical processor may be dynamically decreased and, therefore, cause the speed of the component to decrease. Finally, the identified logical processor may have an LP-RPB value that indicates the preference for the logical processor is higher than one or more logical processors in the same core but lower than one or more other processors in the same core. In this scenario, the utilization of a pipeline component handling the logical processor may be dynamically changed such that it is greater than the utilization by logical processors with lower performance preferences in the same core and less than the utilization by logical processors with higher performance preferences in the same core.

Figure 5:
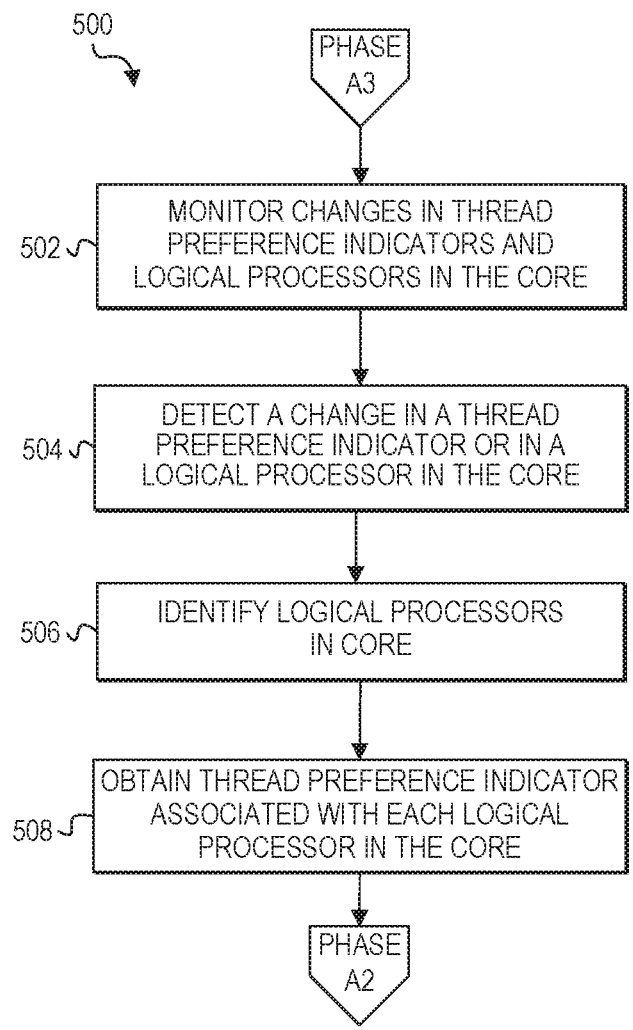
FIG. 5 is a simplified flowchart of further potential operations associated with dynamic performance biasing of logical processors in accordance with certain embodiments.

When hardware resources, execution cycles, and/or component speed have been dynamically adjusted for the logical processors of the same core, flow may go to Phase A3, depicted in FIG. 5.

Figure 4:
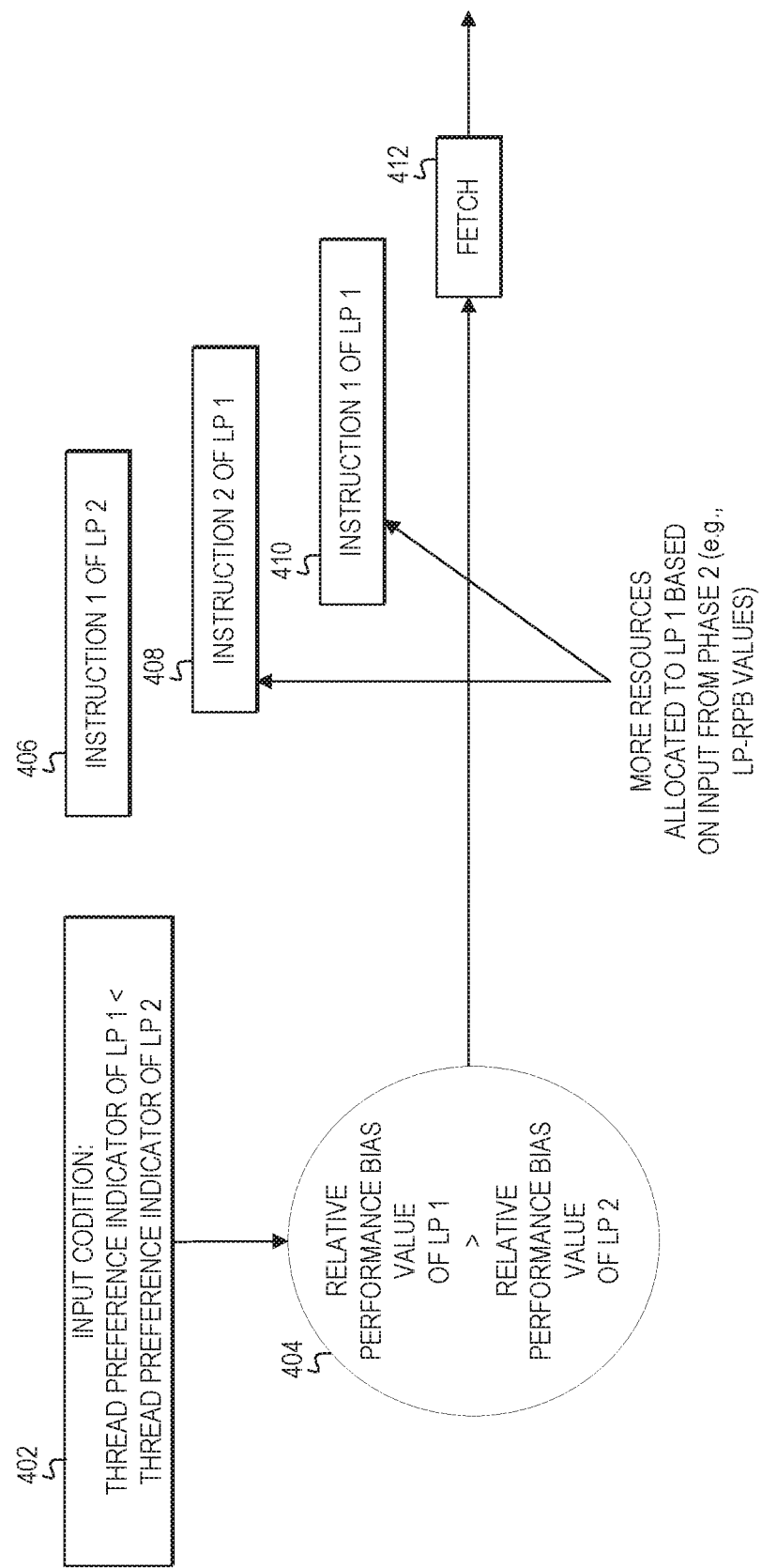
FIG. 4 is a block diagram depicting an example of dynamic performance biasing of logical processors in accordance with certain embodiments.

FIG. 4 is a block diagram depicting an example scenario of logical processor performance biasing according to an embodiment of the present disclosure. FIG. 4 illustrates how sharing of the pipeline can be biased to ensure performance bias towards a logical processor requesting more performance in an SMT core. The example in FIG. 4 involves a logical processor 1 (LP 1) and a logical processor 2 (LP 2). An input condition 402 is based on thread preference indicators of LP 1 and LP 2 indicating a higher performance preference for LP 1 as compared to LP 2. In this example, this higher performance preference of LP 1 is indicated by the value of the thread preference indicator of LP 1 being less than the value of the thread preference indicator of LP 2.

At 404, a relative performance bias value is computed for the logical processors based on the associated thread preference indicators. In this example, the relative performance bias value of LP 1 is determined to be greater than the relative performance bias value of LP 2. These relative performance bias values indicate that LP 1 is to receive a greater share of hardware resources, a greater number of execution cycles, and increased pipeline component utilization as compared to what is provided to LP 2. Accordingly, when instruction 1 of LP 1 at 410, instruction 2 of LP 1 at 408, and instruction 1 of LP 2 at 406 are fetched at 412, performance biases of LP 1 and LP 2 are adjusted based on the relative performance bias values of LP 1 and LP 2. The performance bias of LP 1 can be increased by providing more hardware resources, execution cycles, and/or component utilization to LP 1 than to LP 2. The performance bias of LP 2 can be decreased by providing fewer hardware resources, execution cycles, and/or component utilization to LP 2 than provided to LP 1. This performance biasing of the logical processors is based on input from Phase A2, shown at 404.

FIG. 5 is a simplified flowchart of possible operations that may be associated with an embodiment of logical processor performance biasing in computing system 100. FIG. 5 represents Phase A3 of LP relative performance biasing. In at least one embodiment, a set of operations corresponds to activities of FIG. 5. An SMT core (e.g., core A 160A, core B 160B), or a portion thereof, may utilize the set of operations. The SMT core may comprise means, such as hardware, for performing the operations. In one example, at least some of the operations shown in flow 500 may be performed by LP computation circuit 162A or 162B, depending on the core where the threads are assigned to logical processors. For ease of reference, FIG. 5 will be further described herein assuming that the threads of the application are to be assigned to logical processors 164A(1) and 164A(2) of core A 160A.

In Phase A3, logical processors in a core and thread preference indicators are monitored to enable dynamic updates to hardware resource allocation, execution cycles allocation, and pipeline component utilization based on changes in the thread preference indicators associated with logical processors on the core and/or based on changes to the logical processors on the core (e.g., becoming idle/active). At 502, changes in thread preference indicators and logical processors in the core are monitored.

At 504, a change is detected in either a thread preference indicator or in a logical processor in the core. In one scenario, a change to a thread preference indicator may be detected when any one (or more) of the thread preference indicators of the threads currently running in the logical processors of the core has increased or decreased since the LP relative performance bias values were last computed (e.g., at 302). In another scenario, if no diversity was present in the thread preference indicators initially, then a change to a thread preference indicator may be detected at 504 when any one (or more) of the thread preference indicators of the threads currently running in the logical processors of the core has increased or decreased since the thread level indicators were read (e.g., at 210).

A change may also be detected in a logical processor in the core if a thread running in that logical processor finishes executing and the logical processor becomes idle. In another example, a change to a logical processor may be detected if a new thread of the application is assigned to a previously idle logical processor in the core. If it is determined that there has been a change in at least one thread preference indicator or in at least one logical processor, then at 506, all logical processors in the core are identified. At 508, the thread preference indicators of threads associated with each of the logical processors in the core are obtained. Flow then passes back to Phase A2 to recompute the LP relative performance bias values and to adjust the resource allocations, number of execution cycles, and/or speed of pipeline components for the logical processors based on the new LP-RPB values.

Figure 6:
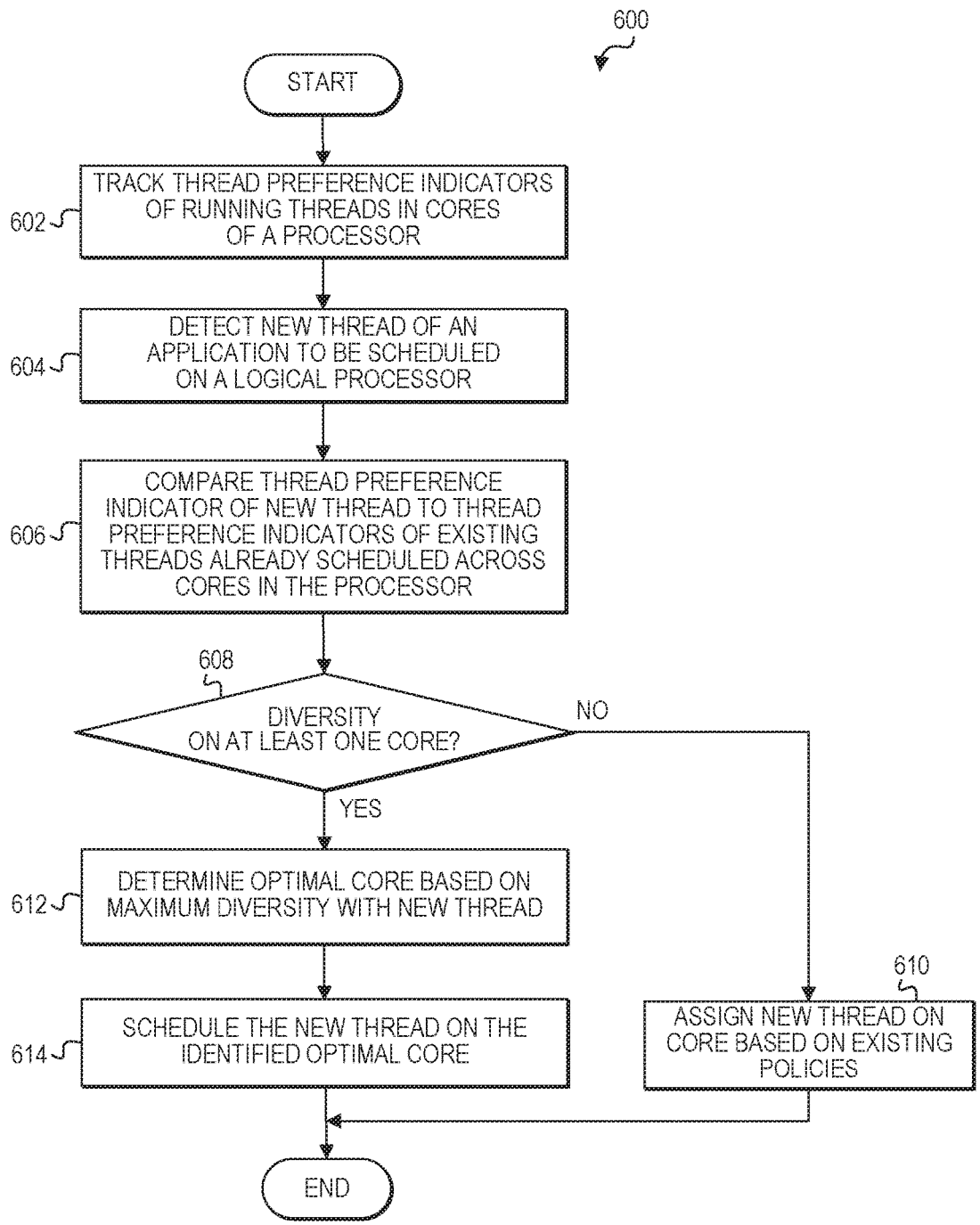
FIG. 6 is a simplified flowchart of further potential operations associated with leveraging dynamic performance biasing of logical processors to schedule threads.

Turning to FIG. 6, FIG. 6 is a simplified flowchart of possible operations that may be associated with an embodiment of logical processor performance biasing in computing system 100. In at least one embodiment, a set of operations corresponds to activities of FIG. 6. In at least one embodiment, a software component (e.g., operating system 140, system application 120, user application 130, etc.), or a portion thereof, may utilize the set of operations. The software components may comprise means, such as processor 170, for performing the operations. In one example, at least some of the operations shown in flow 600 may be performed by a thread scheduler (e.g., 124, 134, or 144), depending on the particular software component that is configured to utilize the set of operations.

At 602, thread preference indicators of threads running in logical processors across all of the cores of the processor (e.g., logical processors 164A(1), 164A(2), 164B(1), and 164B(2)) are tracked. At 604, a new thread of an application to be scheduled on a logical processor is detected. At 606, a comparison is performed on the thread preference indicator of the new thread to thread preference indicators of existing threads already scheduled in multiple cores in the processor. At 608, a determination is made, based on the comparison, as to whether diversity is present on a least one core. Diversity is present in a core if the thread preference indicator of the new thread is different than at least one thread preference indicator of another thread already scheduled in a logical processor of the core. If no diversity is present on at least one core, then at 610, the new thread can be assigned to any core, according to existing scheduling policies, and then the flow ends.

If diversity exists on at least one core, then at 612, a determination of maximum diversity can be used to identify an optimal core for the new thread. Maximum diversity is present in a core if the core has more diversity with the new thread than all other cores would have with the new thread. In another embodiment, the optimal core is the core in which the highest logical processor performance bias value can be computed for the new thread based on the currently active logical processors in the cores. In yet another embodiment, the optimal core is the core in which the new thread would have the highest performance preference (e.g., lowest thread preference indicator)as compared to the other cores. At 614, the new thread is scheduled on the identified optimal core.

Figure 7:
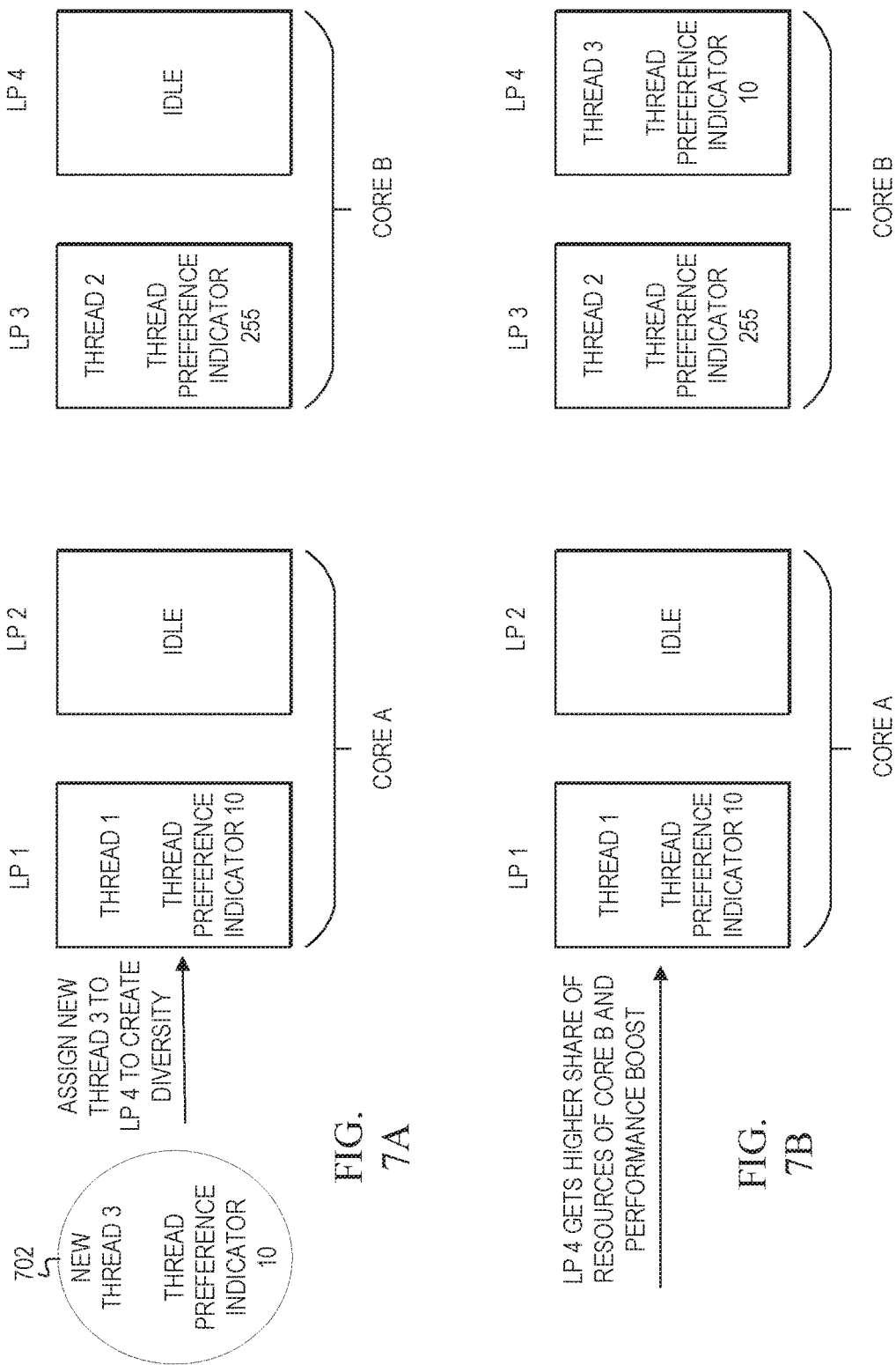
FIGS. 7A-7B is a block diagram depicting an example of leveraging dynamic performance biasing of logical processors to schedule threads.

FIGS. 7A-7B are block diagrams depicting an example scenario of maximizing leverage of logical processor performance biasing to schedule threads of applications according to an embodiment of the present disclosure. In this illustrative example, thread preference indicators can be set between 0 and 255, where 0 represents the highest thread performance preference and therefore seeks the most performance bias (e.g. highest proportion of resources), and 255 represents the lowest thread performance preference and therefore seeks the least performance bias (e.g. lowest proportion of resources).

FIG. 7A shows example cores A and B, each having two logical processors, LP 1 and LP 2 on core A and LP 3 and LP 4 on core B. A thread 1 is running on LP 1 and has a thread preference indicator of 10, while LP 2 is idle. A thread 2 is running on LP 3 and has a thread preference indicator of 255, while LP 4 is idle. A new thread 3 at 702 has a thread preference indicator of 10 and is to be assigned to one of the idle logical processors LP 2 on core A or LP 4 on core B. If new thread 3 is assigned to LP 2, then no diversity will be present in core A. Both threads 1 and 3 seek greater performance bias based on their high thread performance preferences, as indicated by their respective thread preference indicators being set to 10. If new thread 3 is assigned to LP 4 on core B, however, then diversity will be present in core B with thread 2 having a thread preference indicator of 255 and new thread 3 having a thread preference indicator of 10.

FIG. 7B shows new thread 3 assigned to LP 4 of core B. Based on the relativeness between thread preference indicator values of 10 and 255, LP relative performance bias values can be computed for LP 3 and LP 4. Accordingly, LP 4 gets a greater proportion of resources of core B and also a performance boost (e.g., higher utilization of pipeline components) compared to LP 3. LP 4 may also be assigned a greater number of execution cycles compared to LP 3.

Figure 8:
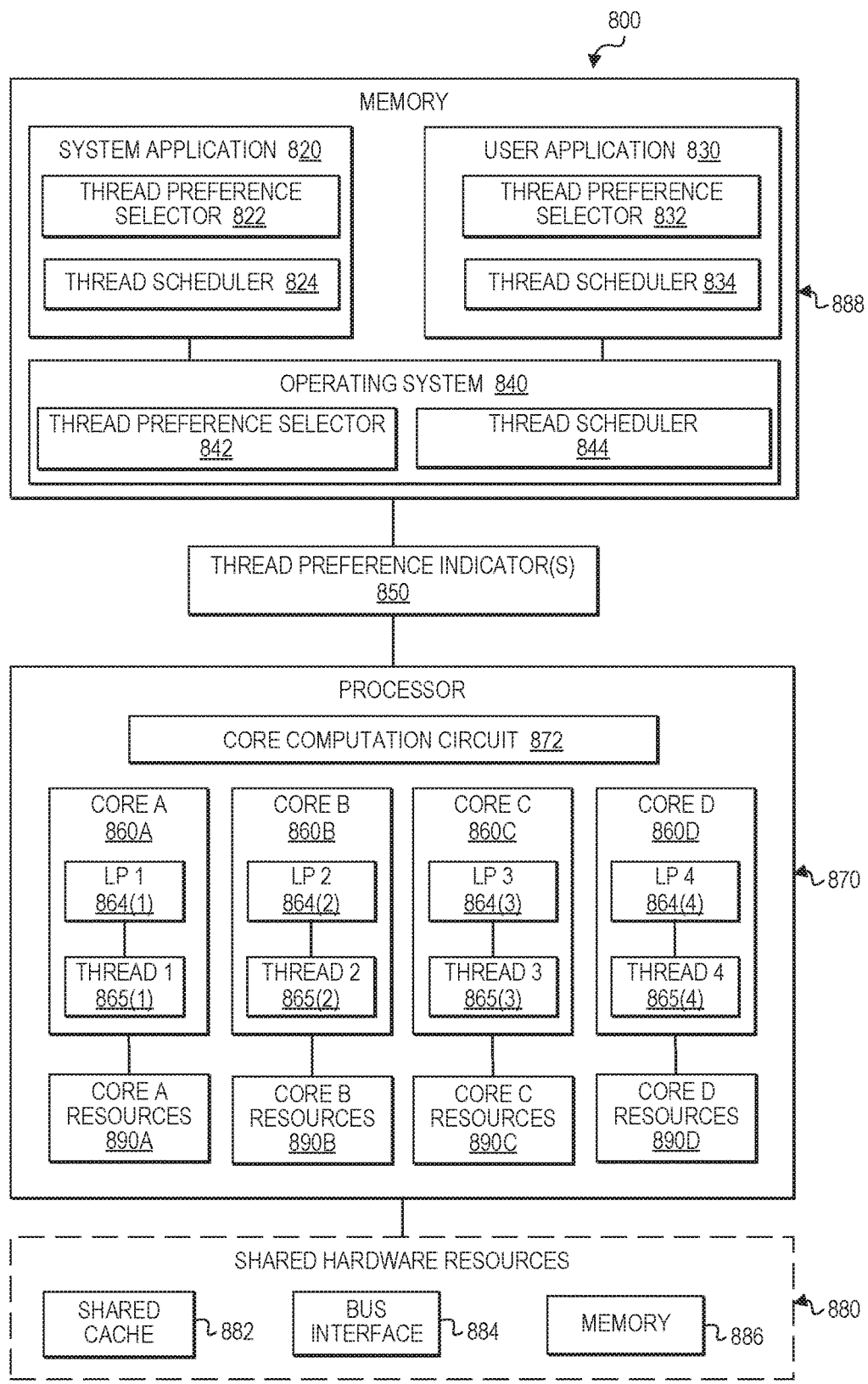
FIG. 8 is a simplified block diagram of another example computing system for dynamic performance biasing for cores in accordance with certain embodiments.

Turning to FIG. 8, a block diagram illustrates an embodiment of a computing system 800 configured for dynamic relative performance biasing for cores of multicore systems. At least one embodiment can be implemented with cores that support simultaneous multithreading (also referred to herein as 'SMT-enabled'). At least one other embodiment can be implemented with cores that do not support simultaneous multithreading (also referred to herein as 'non SMT-enabled'). In computing system 800, dynamic LP performance biasing is extended to control core level optimization based on the thread preference indicators. Thread preference indicators can be used in a similar manner, as previously described herein, to compute core relative performance bias values. The core relative performance bias values, however, can be used in the multicore processor for biasing shared hardware resources, including encore resources, among cores of the multicore processor. Shared hardware resources can include, for example, shared cache (e.g., L3 cache), on-die memory controller, point-to-point processor interconnect, bus interface, memory, etc. In addition, if any pipeline or other components are shared across cores, the core relative performance bias values can be used for biasing execution cycles and/or component speed across the cores. Core performance biasing based on thread preference indicators can enable dynamic control over the amount of resources used by a core to give more power savings or performance to an application as and when needed.

In an example of this embodiment, computing system 800 can include one or more system applications (e.g., 820), one or more user applications (e.g., 830), and an operating system (e.g., 840), any or all of which may be stored in memory 888. System and user applications may include thread preference selectors (e.g., 822, 832, 842) and thread schedulers (e.g., 824, 834, 844). Thread preference indicators 850 can be stored in any suitable storage or memory, such as a hardware register, and may be obtained by a processor 870. Processor 870 can include core computation circuit 872 and multiple cores, such as core A 860A, core B 860B, core C 860C, and core D 860D. In a multicore system that does not support SMT, each core can include a single logical processor with an associated thread at any given time. In FIG. 8, for example, core A includes LP 1 864(1) with thread 1 865(1), core B includes LP 2 864(2) with thread 2 865(2), core C includes LP 3 864(3) with thread 3 865(3), and core D includes LP 4 864(4) with thread 4 865(4). The cores A-D may each have core-specific resources (e.g., core A resources 890A, core B resources 890B, core C resources 890C, and core D resources 890D). Shared hardware resources allocated across the cores and can include, for example, shared cache 882, bus interface 884, and memory 886. In at least one embodiment, memory 888 is part of memory 886, which may be a main memory (e.g., random access memory (RAM)) for computing system 800. Not shown in FIG. 8 is storage (e.g., hard disk, solid state drives, etc.) that can be provisioned in computing system 800 for storing data and code. Other shared hardware resources to which performance biasing may be applicable could include, but are not necessarily limited to internal registers, access ports, out of order microarchitecture features, etc.

For an SMT-enabled system, in at least some embodiments, each core may include LP computation circuit (shown in FIG. 1) for leveraging thread preference information among different logical processors in the same SMT-enabled core, as described with reference to FIGS. 1-5. In an embodiment that includes core relative performance biasing, however, the allocation of a shared hardware resource among logical processors in the same SMT-enabled core is computed based on an LP relative performance bias values of the logical processors and the amount of the shared hardware resource that is allocated to that core.

Embodiments of computing system 800 (both SMT-enabled and non SMT-enabled) can leverage diversity of thread preference information across different cores in the same processor (e.g., 870) and enhance resource sharing by biasing resources among the cores, based on thread performance preferences. In embodiments that support SMT, after resources are biased toward one core over one or more other cores, LP performance biasing, as described herein with reference to FIGS. 1-5, can be performed in each core in which diversity of thread preference indicators associated with logical processors in that core is present. In this scenario, LP performance biasing within the core is performed based on the new amount of resources allocated to the core as a result of the core performance biasing. Any suitable technology, whether currently available or subsequently developed, that is capable of providing thread preference information (e.g., in the form of a thread preference indicator 850), per logical processor can be leveraged by hardware to manage resources efficiently among cores (e.g., non SMT-enabled and SMT enabled) of a processor. This technology can also be leveraged by hardware to manage resources efficiently among logical processors within an SMT-enabled core and to provide performance to the associated application where it is most needed.

In an embodiment, a processor reads the thread preference indicators 850 for all logical processors of all cores in the system. Thread preference indicators can be programmed, configured, or otherwise set by a user application, operating system, system application, or user, for example, as previously described herein with reference to thread preference indicator 150. Processor 870 consolidates the thread preference indicators assigned to the logical processors and computes a value representing the relativeness of the performance bias for each core. The hardware adjusts relative core performance bias for each core based on the computed core performance bias values. More specifically, the hardware can dynamically adjust hardware resource usage (e.g., allocation of shared hardware resources 880) across cores, which can provide more power saving and/or enhance performance.

A computing system for performance biasing across cores, such as computing system 800, can provide several advantages. Within a system containing non SMT-enabled cores, hardware can leverage thread preference information diversity across the cores to manage resources efficiently among the cores. By using the per logical processor thread preference information, hardware can opportunistically bias performance of a core in a non SMT-enabled system. For example, a core that has a logical processor running a thread programmed with a higher performance preference (e.g., high priority or more important thread), as indicated by the thread's thread preference indicator, can be given a greater share of shared hardware resources as compared to another core that has a logical processor running a thread programmed with a lower performance preference (e.g., low priority or less important thread), as indicated by that thread's thread preference indicator. Conversely, a non SMT-enabled core that has a logical processor running a thread programmed with a lower performance preference (e.g., low priority or less important thread), as indicated by the thread's thread preference indicator, can be given a lesser share of shared hardware resources than another core that has a logical processor running a thread programmed with a higher performance preference (e.g., high priority or more important thread), as indicated by that thread's thread preference indicator.

In at least one embodiment, hardware can leverage thread preference indicators across different non SMT-enabled cores within a processor by computing core relative performance bias values for each core and biasing resource availability and performance to the core having the highest core performance bias value. A core relative performance bias value for a particular non SMT-enable core can be computed based on the single thread preference indicator associated with that core relative to the single thread preference indicators associated with the other cores. This approach can result in better responsiveness and application experience within a non SMT-enabled system.

Performance biasing across cores can also provide advantages in an SMT-enabled system. In an SMT-enabled system, the per logical processor thread preference information of multiple threads associated with each core can be used by hardware to opportunistically bias performance of a core. For example, a core that has multiple logical processors running threads programmed with higher performance preferences (e.g., high priority or more important threads), as indicated by the thread preference indicators of the threads, can be given a greater share of shared hardware resources as compared to another core that has multiple logical processors running threads programmed with lower performance preferences (e.g., low priority or less important threads), as indicated by the thread preference indicators of those threads. Conversely, an SMT-enabled core that has multiple logical processors running threads programmed with lower performance preferences (e.g., low priority or less important threads), as indicated by the thread preference indicators of the threads, can be given a lesser share of shared hardware resources than another core that has multiple logical processors running threads programmed with a higher performance preference (e.g., high priority or more important threads), as indicated by the thread preference indicators of those threads.

In at least one embodiment, hardware can leverage thread preference indicators associated with SMT-enabled cores within a processor by computing a core relative performance bias value for each core, and biasing resource availability and performance to the core having the highest core performance bias value. A core relative performance bias value for a particular core can be computed based on the thread preference indicators associated with that core relative to the thread preference indicators associated with the other cores. In at least some scenarios, if thread preference indicators of each core have diversity (i.e., each core is associated with multiple diverse thread preference indicators), then the core performance bias values may be determined based on the highest performance preference programmed for each core. Additionally, the resources allocated to a particular core with multiple logical processors are to be shared by the logical processors within the core. This approach can result in better responsiveness and application experience within an SMT-enabled system.

Computing system 800 may contain infrastructure that is the same as, or similar to computing system 100. Accordingly, a brief discussion of some of the infrastructure of computing system 800, including infrastructure that is distinguished from computing system 100, is now provided. Computing system 800 illustrates processor 870, which can be a non SMT-enabled system in at least one embodiment. In a non-SMT enabled system, each core can have a single logical processor running a single thread at a time, such as core A with LP 1 running thread 1, core B with LP 2 running thread 2, core C with LP 3 running thread 3, and core D with LP 4 running thread 4. It should be apparent, however, that computing system 800 is an example and that embodiments of core performance biasing on non SMT-enabled cores could include two or more cores. Alternatively, processor 870 can be an SMT-enabled system in at least one embodiment. In an SMT-enabled system, each core can have multiple logical processors (as shown in FIG. 1), with each logical processor running a thread associated with a thread preference indicator. For example, in computing system 800, cores A-D could each have two (or more) logical processors and each logical processor could run a thread having a thread preference indicator.

In at least one embodiment, a processor (e.g., processor 870) may contain hardware, such as core computation circuit 862, that performs one or more operations to compute a performance bias value for each core in the processor and to adjust the resources, execution cycles, and/or component speeds allocated to each core, if needed, based on the respective computed performance bias values. Thus, the hardware in a processor can bias performance of cores (e.g., cores A-D) within the processor based on thread preference indicators. To achieve this performance biasing, the core computation circuit may be configured to obtain thread preference indicators 850 associated with threads assigned to logical processors in the cores. A core computation circuit can obtain a thread preference indicator by reading, receiving, being provided, or otherwise gaining access to the thread preference indicator. The relativeness of the thread preference indicators can be used to compute a core relative performance bias (C-RPB) value for each core. In a non SMT-enabled system, for each core, the core computation circuit computes a C-RPB value based on the corresponding single thread preference indicator associated with that core relative to the other single thread preference indicators associated with the other cores.

In an SMT-enabled system, for each core, the core computation circuit can compute a C-RPB value based on the one or more corresponding thread preference indicators associated with that core relative to the one or more thread preference indicators associated with the other cores. In one possible implementation, the thread preference indicator that indicates the highest performance preference in each core may be used to assess relativeness for computing C-RPB values for each core. In other implementations, other factors may be considered when determining relativeness to compute C-RPB values. For example, other factors can include an amount of diversity in each core, a number of logical processors in each core, the number of logical processors with a higher (or lower) performance preference, etc.

Once the C-RPB values are computed for a non SMT-enabled system or an SMT-enabled system, core computation circuit 872 or other hardware in the processor can then dynamically adjust, for each core, hardware resource usage of shared hardware resources, a number of execution cycles, and/or speed of components shared across the cores. The adjustments can be made based on the computed C-RPB values. The core computation circuit can be further configured to monitor thread preference indicator changes and logical processor changes (e.g., becoming idle, becoming active) and dynamically updating shared hardware resource allocations, number of execution cycles, and component speeds.

In embodiments described herein, hardware resource usage can be dynamically adjusted by hardware (e.g., 862). In one example, the shared hardware resources may be distributed proportionally among the cores based on the computed C-RPB values. Shared hardware resources 880 can include shared cache 882 (e.g., L3 cache), bus interface 884, and memory 886. Other examples of shared hardware resources can include, but are not limited to, on-die memory controller, point-to-point processor interconnect, access ports, internal registers, microarchitecture features, etc. Shared hardware resources 880 can be allocated across the cores in the processor. For example, shares of shared cache 882 and memory 886 can be dynamically adjusted and allocated to cores A-D. Bandwidth of bus interface 884 can be dynamically adjusted and allocated to cores A-D.

If pipeline components or other components are shared across cores, the number of execution cycles allocated to cores could be dynamically adjusted by hardware (e.g., 862) based on thread preferences, as previously described herein with respect to logical processors. Also, hardware (e.g., 862) can give a core with a higher performance preference, as compared to other cores running on the same processor, more preference in shared pipeline components or other shared components. Although performance biasing may be implemented across cores in a processor for any shared resource, number of execution cycles, or component speeds associated with the cores, for ease of explanation, further description herein of computing system 800 may refer only to performance biasing of shared hardware resources. However, it should be understood that such biasing may also be applicable to execution cycles and/or component speeds shared across cores.

Embodiments of computing system 800 may be implemented using any suitable way of achieving desired performance biasing among cores in a processor. In one example, shares of shared hardware resources may be distributed proportionally among the cores of a processor based on the computed C-RPB values. C-RPB values can be computed in various ways based on a relativeness of the thread preference indicators across the cores. For example, for C-RPB values computed based on thread preference indicators having significantly different performance preference levels (e.g., 10 and 255), shares of shared hardware resources could be allocated among the cores and have a wider proportional difference than if the thread preference indicators indicated less diverse performance preference levels (e.g., 10 and 20). In another example, predetermined percentage distributions may be used. For example, assume four cores A-D have respective logical processors LP 1 through LP 4, and the logical processors are associated with threads having diverse thread preferences as indicated by their respective thread preference indicators. Shared hardware resources (e.g., 880) may be divided among the cores by predetermined percentages (e.g., 40-30-20-10 percentages) that correspond to the cores in order according to thread preference indicators (e.g., highest to lowest performance preferences) of their logical processors. In another example, for four cores associated with diverse thread preference indicators, hardware resources may be divided among the cores by predetermined percentages (e.g., 70-10-10-10 or 30-30-30-10 percentages) that provide greater increased bias for only the core associated with the thread preference indicator that indicates the highest performance preference and/or that provide greater decreased bias for only the core associated with the thread preference indicator that indicates the lowest performance preference.

In non SMT-enabled systems, all shares of hardware resources allocated to a particular core (e.g., core A 860A) may be used by that core's logical processor (e.g., LP 1864(1)). In an SMT-enabled system, however, the shares of hardware resources allocated to a particular core (e.g., core A 860A) may be dynamically biased across multiple logical processors within the core if the logical processors are associated with threads having diverse thread preference indicators. The LP performance biasing may be implemented as previously described herein with reference to FIGS. 1-5.

Figure 9:
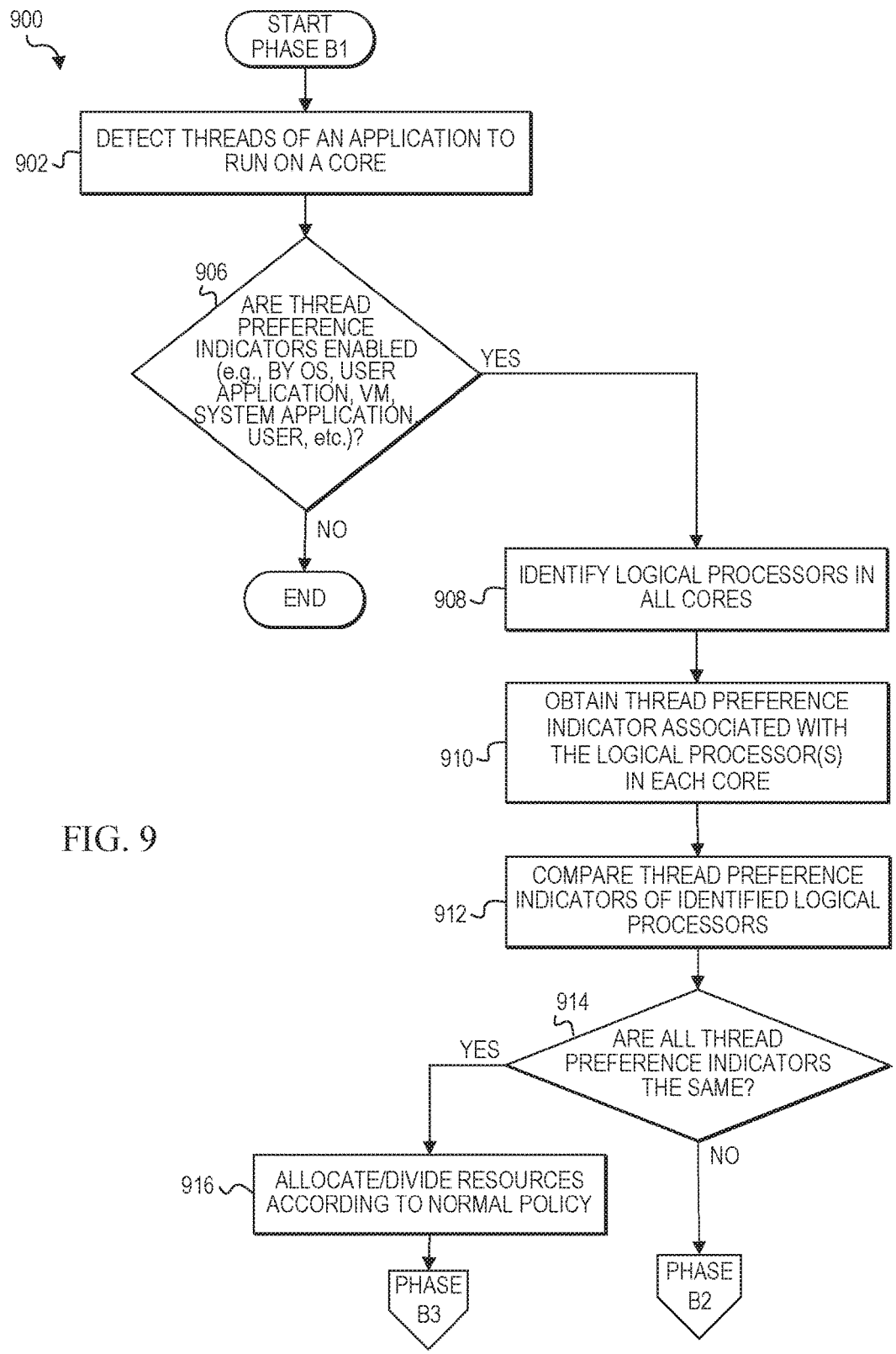
FIG. 9 is a simplified flowchart of potential operations associated with dynamic performance biasing of cores and logical processors in accordance with certain embodiments.

FIG. 9 is a simplified flowchart of possible operations that may be associated with an embodiment of core performance biasing in computing system 800. For ease of illustration, core performance biasing is described in three phases, Phase B1, Phase 132, and Phase B3. FIG. 9 represents Phase B1. In at least one embodiment, a set of operations corresponds to activities of FIG. 9. A processor (e.g., processor 870), or a portion thereof, may utilize the set of operations. The processor may comprise means, such as hardware, for performing the operations. In one example, at least some of the operations shown in flow 900 may be performed by core computation circuit 872.

Phase B1 identifies whether an application uses thread preference indicators and whether the application, operating system, or user has programmed different thread preference indicators for threads to run on logical processors in a core (e.g., cores 860A-860D). At 902, threads of an application to run on a core (e.g., core A 860A) are detected. The cores may be either SMT-enabled or non SMT-enabled. At 906, a determination is made as to whether thread preference indicators are enabled for the threads of the application. For example, a thread preference indicator bit may be set by a component (e.g., operating system, user application, system application, virtual machine, user, etc.) if that component has employed the use of thread preference indicators to set thread preferences for the threads of the application. If thread preference indicators are not enabled (e.g., the thread preference indicator bit is not set), then flow ends. It should be apparent that any suitable technique may be used to provide an indication by a software component that thread preference indicators are set for threads of an application.

If thread preference indicators are enabled as determined at 906 (e.g., thread preference indicator bit is set), then at 908, the all logical processors in all of the cores are identified (e.g., 864A(1)-864A(4)). At 910, thread preference indicators are obtained for all of the threads running on the identified logical processors of the cores. In one non-limiting example, the values of the thread preference indicators can range from 0 to 255, as previously described herein.

At 912, the thread preference indicators of the identified logical processors are compared. At 914, a determination is made as to whether all thread preference indicators of threads running on logical processors in the cores have the same value. If the thread preference indicators of threads in all the cores have the same value, then at 916, shared hardware resources are allocated and divided among the identified cores according to normal policies of the system. Flow passes to Phase B3, as described in FIG. 11, to monitor changes to thread preference indicators and logical processors of the multiple cores. If a determination is made, at 914, that at least one different value is present among the thread preference indicators of threads across all of the cores, then flow passes to Phase 132, as described in FIG. 10.

Figure 10:
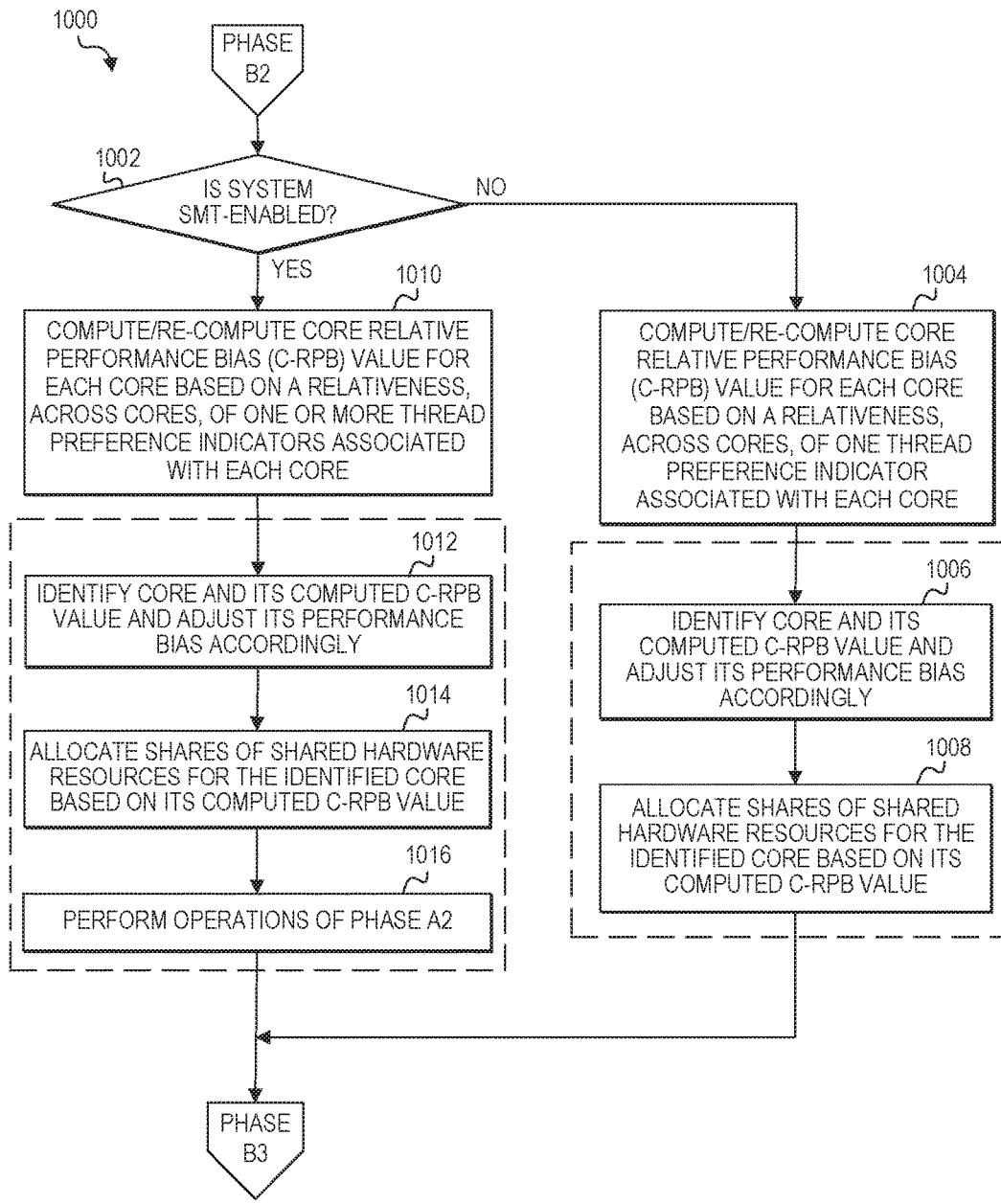
FIG. 10 is a simplified flowchart of further potential operations associated with dynamic performance biasing of cores and logical processors in accordance with certain embodiments.

FIG. 10 is a simplified flowchart of possible operations that may be associated with an embodiment of core relative performance biasing in computing system 800. FIG. 10 represents Phase B2 of core relative performance biasing. In at least one embodiment, a set of operations corresponds to activities of FIG. 10. A processor (e.g., processor 870), or a portion thereof, may utilize the set of operations. The core may comprise means, such as hardware, for performing the operations. In one example, at least some of the operations shown in flow 1000 may be performed by core computation circuit 872.

In Phase B2, the core relative performance bias values are computed. The type of relativeness used to compute core relative performance bias values depends on whether the system is SMT-enabled or non SMT-enabled, as indicated at 1002. If the system is non SMT-enabled, then at 1004, core relative performance bias values are computed based on the relativeness of thread preference indicators across cores in a processor, where each core is associated with a single logical processor and, therefore, can be associated with a single thread preference indicator. For example, a core relative performance bias (C-RPB) value can be computed for a core based on the thread preference indicator of the thread assigned to the logical processor of the core and the thread preference indicators of threads assigned to other logical processors of other cores in the processor. Relativity can be computed based on the values of the thread preference indicators. In non SMT-enabled cores, the relativeness of thread preference indicators can be used to compute C-RPB values in any of the ways previously discussed herein with reference to FIGS. 1-5 for computing LP-RPB values. For example, relativeness can be used to determine proportional values of thread preference indicators, predetermined proportions for ordered logical processors (and their associated cores) according to associated thread preference indicators, or predetermined proportions for cores associated with an identified highest and/or lowest performance preference as indicated by the thread preference indicators. C-RPB values may be expressed as percentages or in any other suitable form that can be used to determine the amount of shared hardware resources to be allocated for each core, as previously described herein. Generally, any desired performance biasing among cores of a processor may be implemented based on diverse thread preference indicators associated with the cores, and C-RPB values can be computed accordingly to achieve the desired biasing.

In non SMT-enabled systems, 1006-1008 may be performed, as needed, for each core in a processor while threads in the core are running. The performance bias of each core can be adjusted, if needed, based on its computed C-RPB value. Generally, if a core has higher relative performance bias, then it is given a greater share of shared hardware resources (e.g., shared cache 882, bus interface 884, memory 886, etc.), which may include encore resources. At 1006, a core (e.g., core A 864A(1)) and its computed C-RPB value are identified. A core can be identified for dynamically adjusting its performance bias, as and when needed, based on shared hardware resources needing to be allocated (e.g., when shared hardware resources are requested for a new thread). The performance bias of the identified core can be adjusted (e.g., increased or decreased), if needed, based on the C-RPB value computed for the core.

An example of adjusting the performance bias of a core is indicated at 1008. At 1008, a share of one or more shared hardware resources is allocated for the identified core based on the C-RPB value computed for that core. If the identified core has a C-RPB value that indicates a higher performance preference of the identified core (e.g., core 860A) as compared to all other cores in the same processor (e.g., cores 860B-860D), then a greater share of shared hardware resources is allocated for the identified core. Conversely, if the identified core (e.g., core 860A) has a C-RPB value that indicates a lower performance preference of the identified core as compared to all other cores in the same processor (e.g., cores 8603-860D), then a lesser share of hardware resources is allocated for the identified core. Finally, the identified core may have a C-RPB value that indicates the performance preference of the identified core is higher than one or more cores in the same processor but lower than one or more other cores in the same processor. In this scenario, the share of shared hardware resources allocated to the identified core may be greater than shares allocated for cores associated with lower performance preferences in the same processor and less than shares allocated for cores associated with higher performance preferences in the same processor.

With reference again to 1002, if the system is SMT-enabled, then at 1010, C-RPB values are computed based on the relativeness of thread preference indicators across cores in a processor, where each core is associated with one or more thread preference indicators. For example, a C-RPB value can be computed for a core based on the relativeness of one or more thread preference indicators associated with threads running on logical processors in that core, and the one or more thread preference indicators associated with threads running on logical processors in the other cores of the processor. Relativity can be computed based on the values of the thread preference indicators. In one example, a thread preference indicator of a thread from each core is selected based on indicating the highest performance preference within the core. The relativeness of these selected thread preference indicators from each core can be used to compute C-RPB values in any of the ways previously discussed herein with reference to FIGS. 1-5 for computing L-RPB values. For example, relativeness can be used to determine proportional values of selected thread preference indicators, predetermined proportions for ordered logical processors (and their associated cores) according to associated thread preference indicators, or predetermined proportions for cores associated with an identified highest and/or lowest performance preference as indicated by the selected thread preference indicators.

In some scenarios for SMT-enabled cores, other factors may be considered when determining relativeness to compute C-RPB values. For example, other factors can include, but are not necessarily limited to, an amount of diversity in each core, a number of logical processors in each core, the number of logical processors with a higher (or lower) performance preference, etc. Such factors may be considered when assessing the relativeness of the selected thread preference indicators in order to compute a C-RPB value for a core. C-RPB values may be expressed as percentages or in any suitable form to determine the amount of shared hardware resources to be allocated for each core, as previously described herein.

In SMT-enabled systems, 1012-1016 may be performed, as needed, for each core in a processor while threads in the core are running. The performance bias of each core can be adjusted, if needed, based on its computed C-RPB value. Generally, if a core has higher relative performance bias, then it is given a higher share on the of shared hardware resources (e.g., shared cache 882, bus interface 884, memory 886, etc.). At 1012, a core (e.g., core A 864A(1)) and its computed C-RPB are identified. A core can be identified based on hardware resources needing to be allocated (e.g., shared hardware resources are requested). The performance bias of the identified core can be adjusted (e.g., increased or decreased), if needed, based on the C-RPB value computed for the core.

One example of adjusting the performance bias of a core is indicated at 1014. At 1014, a share of one or more shared hardware resources is allocated for the identified core based on the C-RPB computed for that core. If the identified core has a CRPB value that indicates a higher performance preference of the identified core (e.g., core 860A) as compared to all other cores in the same processor (e.g., cores 860B-860D), then a greater share of shared hardware resources is allocated for the identified core. Conversely, if the identified core (e.g., core 860A) has a C-RPB value that indicates a lower performance preference of the identified core as compared to all other cores in the same processor (e.g., cores 860B-860D), then a lesser share of hardware resources is allocated for the identified core. Finally, the identified core may have a C-RPB value that indicates the performance preference of the identified core is higher than one or more cores in the same processor but lower than one or more other cores in the same processor. In this scenario, the share of shared hardware resources allocated to the identified core may be greater than shares allocated for cores associated with lower performance preferences in the same processor and less than shares allocated for cores associated with higher performance preferences in the same processor.

In an SMT-enabled system, at 1016, operations as shown and described with reference to Phase A2 in FIG. 3, may be performed for logical processors of the core identified at 1012 (e.g., 860A-860D). In Phase A2, at 302, the logical processor (LP) relative performance bias values are computed based on the relativeness of the thread preference indicators across logical processors in an SMT core (e.g., core A 860A). For example, an LP relative performance bias (LP-RPB) value is computed for each logical processor within the core identified at 1012, based on the relativeness of a thread preference indicator of the thread assigned to that logical processor and thread preference indicators of threads assigned to other logical processors within the same core. Generally, any desired performance biasing among logical processors of the same core may be implemented based on diverse thread preference indicators associated with the logical processors, as previously described herein with reference to FIGS. 1-5, and LP-RPB values can be computed accordingly to achieve the desired biasing.

Operations 304-312 may be performed, as needed, for each logical processor in the identified core while the associated threads are running. The performance bias of each logical processor can be adjusted, if needed, based on its computed LP-RPB value. Generally, if a logical processor on a core has higher relative performance bias, then it is given a higher share on the core pipeline, including a higher utilization of a pipeline component handling the logical processor, a greater number of execution cycles than other logical processors are given, and a greater share of hardware resources than the shares allocated to other logical processors. The share of hardware resources can include a greater share of core-specific hardware resources and potentially a greater share of the portion of shared hardware resources allocated to the identified core at 1014.

At 304, a logical processor (e.g., LP 1 864(1)) and its computed LP-RPB are identified. A logical processor can be identified based on hardware resources needing to be allocated (e.g., hardware resources are requested), execution cycles needing to be divided among logical processors (e.g., new thread scheduled), and/or initiation of a pipeline component to handle the logical processor. The performance bias of the identified logical processor can be adjusted (e.g., increased or decreased), if needed, based on the LP-RPB value computed for the logical processor.

Adjusting the performance bias of the identified logical processor is performed in 306-310. At 306, shares of one or more core-specific hardware resources (e.g., core A resources 890A) are allocated for the identified logical processor based on the LP-RPB value computed for that logical processor. If the identified logical processor has an LP-RPB value that indicates a higher performance preference for the identified logical processor (e.g., LP 1) as compared to all other logical processors in the same core, then a greater share of the core-specific hardware resources is allocated for the identified logical processor. Conversely, if the identified logical processor has an LP-RPB value that indicates a lower performance preference for the identified logical processor as compared to all other logical processors in the same core, then a lesser share of core-specific hardware resources is allocated for the identified logical processor. Finally, the identified logical processor may have an LP-RPB value that indicates the performance preference for the logical processor is higher than one or more logical processors in the same core but lower than one or more other processors in the same core. In this scenario, the share of core-specific hardware resources allocated to the identified logical processor may be greater than shares allocated for logical processors with lower performance preferences in the same core and less than shares allocated for logical processors with higher performance preferences in the same core.

Also at 306, shares of one or more shared hardware resources (e.g., shared cache 882, bus interface 884, memory 886, etc.) may be allocated for the identified logical processor based on the LP-RPB value computed for that logical processor. The allocation may be accomplished as described above with reference to allocating core-specific hardware resources. For shared hardware resources, however, the shared hardware resource itself may have been allocated to the identified core based on a C-RPB value associated with the identified core, which contains the identified logical processor. Thus, in this embodiment, the allocation of shared hardware resources among logical processors in a core can be based on the amount of shared hardware resources allocated to the core based on the C-RPB value of the core.

At 308, a number of execution cycles are given to the identified logical processor based on the LP-RPB value computed for that logical processor, as previously described herein. At 310, the speed of one or more components handling the identified logical processor may be dynamically changed based on the LP-RPB value computed for that logical processor, as previously described herein. When hardware resources (e.g., core-specific and shared), execution cycles, and/or component speed have been dynamically adjusted for the logical processors of the same core, flow may go back to Phase B3, as depicted in FIG. 10.

Figure 11:
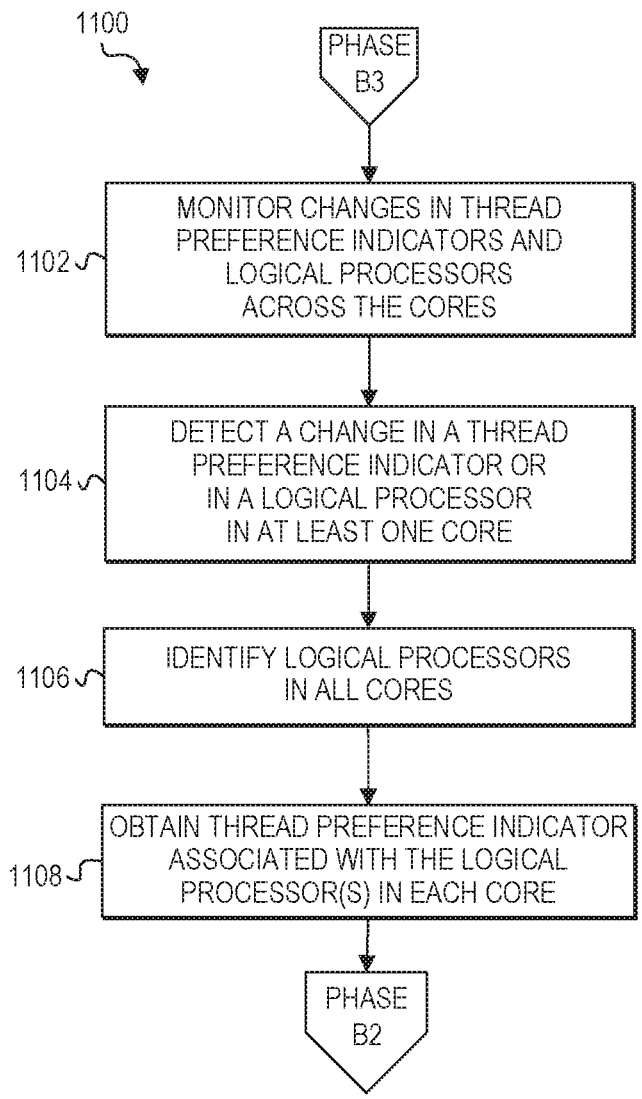
FIG. 11 is a simplified flowchart of further potential operations associated with the dynamic performance biasing of cores and logical processors in accordance with certain embodiments.

FIG. 11 is a simplified flowchart of possible operations that may be associated with an embodiment of core dynamic performance biasing in computing system 800. FIG. 11 represents Phase B3 of core relative performance biasing. In at least one embodiment, a set of operations corresponds to activities of FIG. 11. A multicore processor (e.g., processor 870), or a portion thereof, may utilize the set of operations. The cores of the processor may be SMT-enabled or non SMT-enabled. The processor may comprise means, such as hardware, for performing the operations. In one example, at least some of the operations shown in flow 1100 may be performed by core relative computation circuit 872.

In Phase B3, logical processors in a core and thread preference indicators are monitored to enable dynamic updates to shared hardware resource allocation for both SMT-enabled cores and non SMT-enabled cores, based on changes in the thread preference indicators associated with logical processors in the cores and/or based on changes to the logical processors in the core (e.g., becoming idle/active). For SMT-enabled cores, the monitoring can also enable dynamic updates to core-specific hardware resource allocations, execution cycles allocations, and pipeline component utilization.

At 1102, changes in thread preference indicators and logical processors in the cores are monitored. At 1104, a change is detected in either a thread preference indicator or in a logical processor in at least one of the cores. In one scenario, a change to a thread preference indicator may be detected when any one (or more) of the thread preference indicators of the threads currently running in the logical processors of the cores has increased or decreased since the core relative performance bias values were last computed (e.g., at 1004 for non SMT-enabled systems or at 1010 for SMT-enabled systems). A change may be detected in a logical processor in one of the cores if a thread running in that logical processor finishes executing and the logical processor becomes idle. In another example, a change to a logical processor may be detected if a new thread of the application is assigned to a previously idle logical processor in the core.

If it is determined that there has been a change in at least one thread preference indicator or in at least one logical processor, then at 1106, the logical processors across all cores are identified. At 1108, the thread preference indicators of threads associated with the identified logical processors are obtained. Flow then passes back to Phase B2 to recompute the core relative performance bias values and to adjust the shared hardware resource allocations of the cores based on the new C-RPB values. For SMT-enabled systems, flow may also pass to Phase B2 to recompute the LP relative performance bias values for logical processors in each core and to adjust the hardware resource allocations (e.g., core-specific and/or shared hardware resources), execution cycles allocations, and pipeline component utilization.

Figure 12:
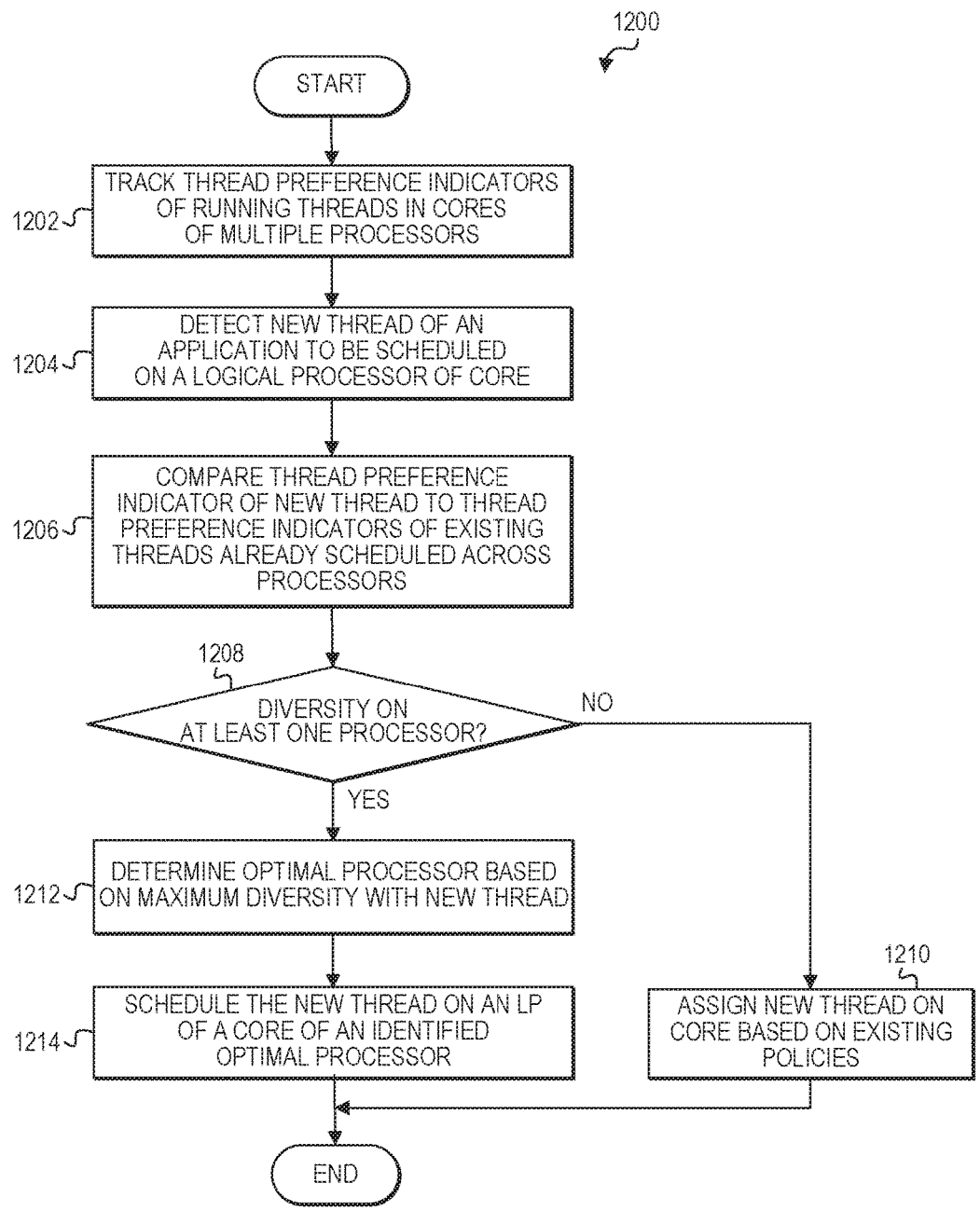
FIG. 12 is a simplified flowchart of further potential operations associated with leveraging dynamic performance biasing of cores to schedule threads.

Turning to FIG. 12, FIG. 12 is a simplified flowchart of possible operations that may be associated with an embodiment of core performance biasing in a multi-socketed computing system, such as computing system 800 including one or more processors in addition to processor 870. In at least one embodiment, a set of operations corresponds to activities of FIG. 12. In at least one embodiment, a software component (e.g., operating system 840, system application 820, user application 830, etc.), or a portion thereof, may utilize the set of operations. The software components may comprise means, such as processor 870 and/or other processors (not shown) in computing system 800, for performing the operations. In one example, at least some of the operations shown in flow 1200 may be performed by a thread scheduler (e.g., 824, 834, or 844), depending on the particular software component that is configured to utilize the set of operations.

At 1202, thread preference indicators of threads running in logical processors across all of the cores across all of the processors are tracked. At 1204, a new thread of an application is detected, where the thread is to be scheduled on a logical processor of a core within one of the processors. At 1206, a comparison is performed on the thread preference indicator of the new thread to thread preference indicators of existing threads already scheduled in the one or more cores in each processor. At 1208, a determination is made, based on the comparison, as to whether diversity is present on a least one processor. Diversity is present in a processor if the thread preference indicator of the new thread is different than at least one thread preference indicator of another thread already scheduled on a core of the processor. In one example of SMT-enabled systems, diversity may be determined by comparing the thread preference indicator of the new thread to the thread preference indicators indicating the highest performance preference within each core. It should be apparent, however, that any other suitable comparison may be used to determine diversity. If no diversity is present on at least one processor (e.g., all thread preference indicators of all processors are the same as the thread preference indicator of the new thread), then at 1210, the new thread can be assigned to a core in any processor, according to existing scheduling policies, and the flow can end.

If diversity exists on at least one core, then at 1212, a determination of maximum diversity can be used to identify an optimal processor for the new thread. Maximum diversity is present in a processor if the processor has more diversity across its cores if the new thread is scheduled on one of its cores than the diversity that each of the other processors would have if the new thread was scheduled on one of their cores. The optimal core may also, or alternatively, be the core in which the highest core performance bias value can be computed for the new thread based on the currently active cores in the processor. In yet another embodiment, the optimal processor is the processor in which the new thread would have the highest performance preference (e.g., lowest thread preference indicator) as compared to the other processors. At 1214, the new thread is scheduled on the identified optimal processor.

Figure 13A:
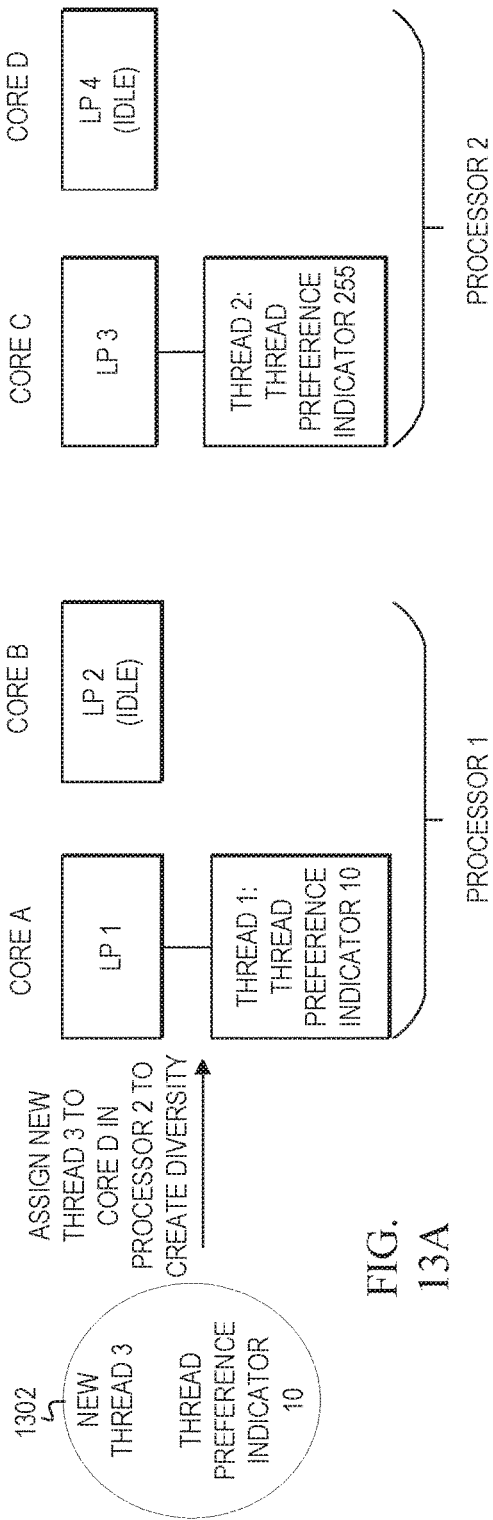
FIGS. 13A-13B is a block diagram depicting an example of leveraging dynamic performance biasing of cores to schedule threads.
Figure 13B:
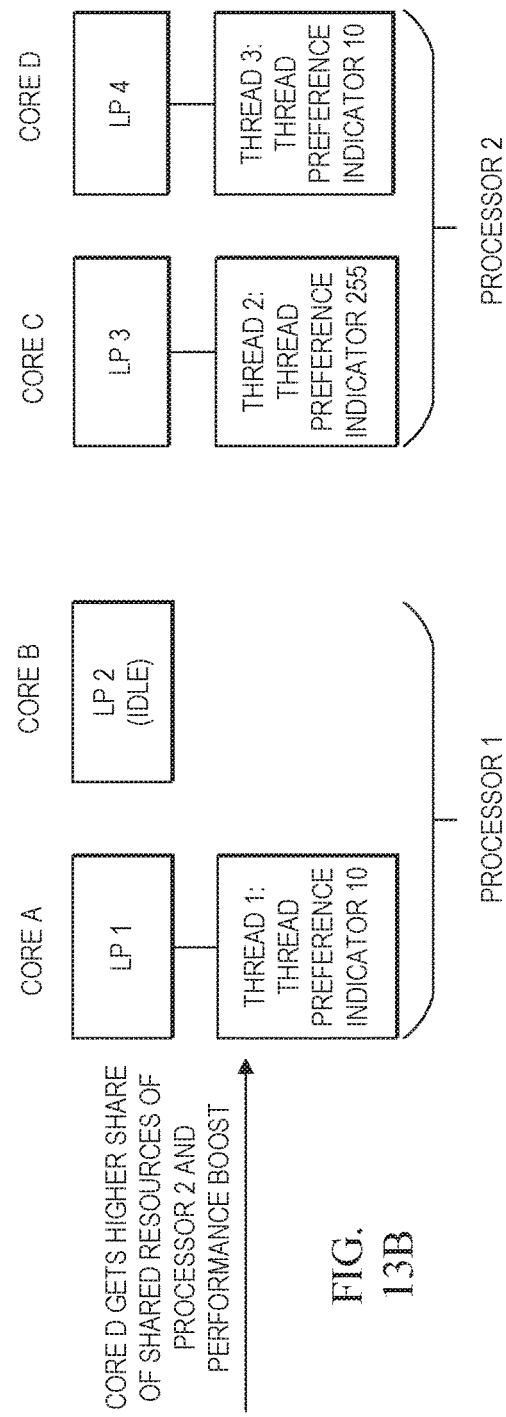

FIGS. 13A-13B are block diagrams depicting an example scenario of maximizing leverage of core performance biasing to schedule threads of applications according to an embodiment of the present disclosure. In this illustrative example, thread preference indicators can be set between 0 and 255, where 0 represents the highest thread performance preference and therefore seeks the most performance bias (e.g. highest proportion of resources), and 255 represents the lowest thread performance preference and therefore seeks the least performance bias (e.g., lowest proportion of resources).

FIG. 13A shows example processors 1 and 2, each having two cores, cores A and B on processor 1, and cores C and D on processor 2. In this example, each core has a single logical processor (e.g., a non SMT-enabled system). It should be noted, however, that the concepts may also be applied to an SMT-enabled system. A thread 1 is running on LP 1 of core A and has a thread preference indicator of 10, while LP 2 of core B is idle. A thread 2 is running on LP 3 of core C and has a thread preference indicator of 255, while LP 4 of core D is idle. A new thread 3 at 1302 has a thread preference indicator of 10 and is to be assigned to one of the idle logical processors, LP 2 on core B of processor 1 or LP 4 of core D on processor 2. If new thread 3 is assigned to LP 2, then no diversity will be present in processor 1. Both threads 1 and 3 seek greater performance bias based on their high thread performance preferences, as indicated by their respective thread preference indicators being set to 10. If new thread 3 is assigned to LP 4, however, then diversity will be present in processor 2 with thread 2 having a thread preference indicator of 255 and new thread 3 having a thread preference indicator of 10.

FIG. 13B shows new thread 3 assigned to LP 4 of core D. Based on the relativeness between thread preference indicator values of 10 and 255 in respective cores C and D, core relative performance bias values can be computed for core C and core D. Accordingly, core D can receive a greater proportion of shared resources of processor 2, such as shared bus resources, shared cache, and/or system (or main) memory, for example.

Figure 14:
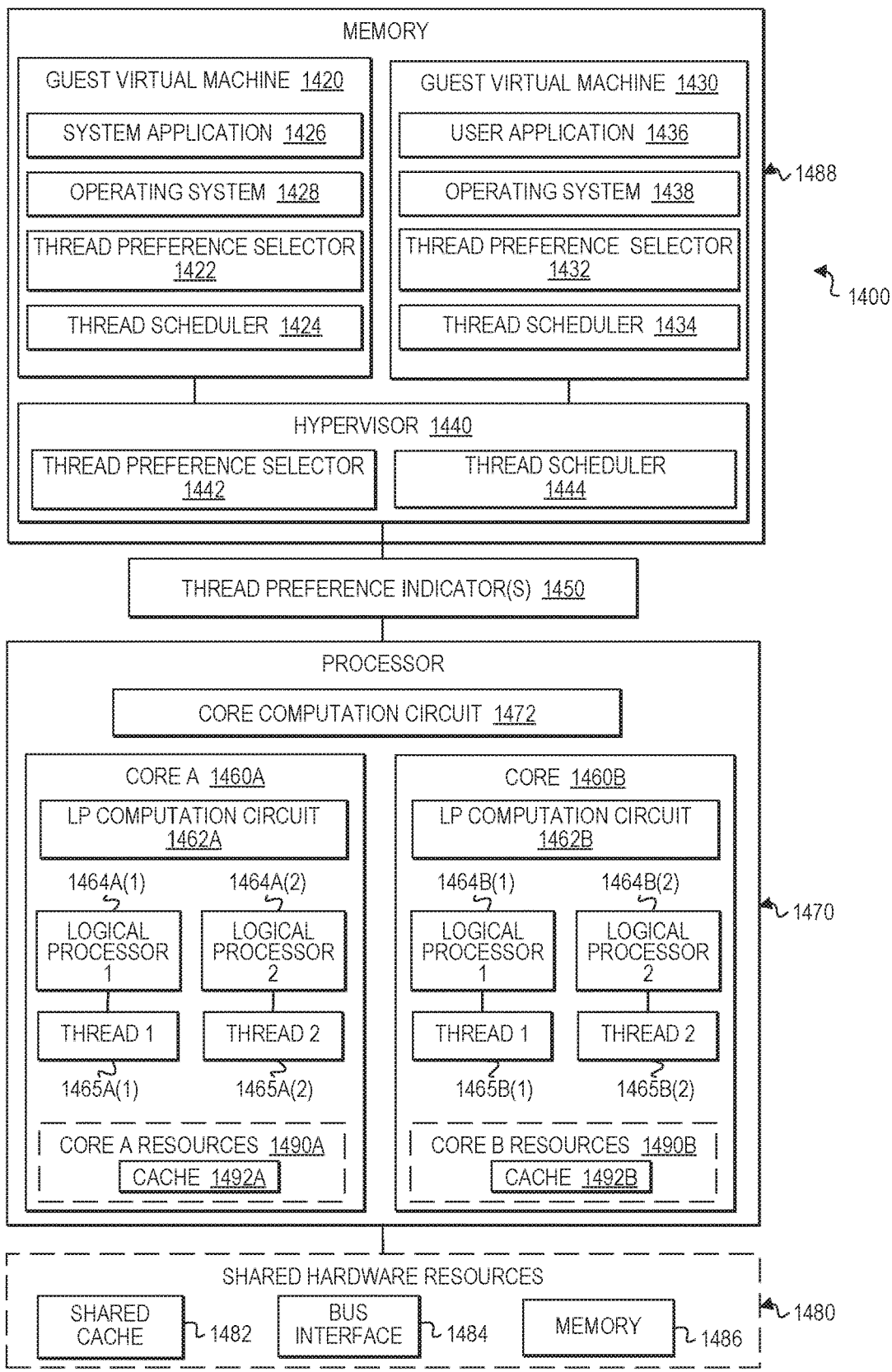
FIG. 14 is a simplified block diagram of an embodiment of a virtualized computing system for dynamic performance biasing for cores and/or logical processors in accordance with certain embodiments.

Turning to FIG. 14, a block diagram illustrates an embodiment of a virtual computing system 1400 configured for logical processor and/or core performance biasing in a virtualized system. At least one embodiment can be implemented with physical cores that support simultaneous multithreading. At least one other embodiment can be implemented with physical cores that do not support simultaneous multithreading. Virtual computing system 1400, as illustrated, can support both LP performance biasing (for SMT-enabled cores) and core performance biasing (for SMT-enabled cores and non SMT-enabled cores). More specifically, using thread preference indicators, computing system 1400 can control logical processor level optimization (for SMT-enabled cores) and/or core level optimization (for SMT-enabled cores and non SMT-enabled cores) in a virtualized system. Thread preference indicators can be used as previously described herein to compute LP relative performance bias values and/or core relative performance bias values. The LP relative performance bias values can be used in an SMT-enabled system for performance biasing of core-specific hardware resources, shared hardware resources, execution cycles, and pipeline component utilization among logical processors within each core. The core relative performance bias values can be used in a multicore SMT-enabled system or non SMT-enabled system for performance biasing of shared hardware resources among the cores. Core-specific resources can include, for example, core-specific cache (e.g., L2 cache). Shared hardware resources, including uncore resources, can include, for example, shared cache (e.g., L3 cache), on-die memory controller, point-to-point processor interconnect, bus interface, memory, etc. In addition, if any pipeline components or other components are shared across cores, the core relative performance bias values can be used for biasing execution cycles and/or component speed across the cores.

In at least one embodiment, virtual computing system 1400 can include one or more guest virtual machines, such as guest virtual machines 1420 and 1430, a hypervisor 1440, and hardware including a processor 1470 and shared hardware resources 1480. Generally, virtualization obscures hardware characteristics of a computing system and presents an abstract platform that can host other platforms, including different operating systems. Hypervisor 1440 (also known as a virtual machine manager) provides the capability of running multiple instances of operating systems and associated guest software concurrently in simulated computing environments referred to herein as "guest virtual machines." For example, in virtualized computing system 1400, guest virtual machine 1420 runs an operating system 1428 with an associated system application 1426, and guest virtual machine 1430 runs an operating system 1438 with an associated user application 1436. The operating systems and applications can be run concurrently by dynamically allocating the hardware resources to operating systems (e.g., 1428 and 1438) and applications (e.g., 1426 and 1436) as needed. In this configuration, system application 1426 is logically run on top of operating system 1426, and user application 1436 is logically run on top of operating system 1438.

In the configuration shown in FIG. 14, guest virtual machines 1420 and 1430 and hypervisor 1440 may be store in memory 1488. In this embodiment, hypervisor 1440 may be a type-2 or hosted hypervisor that runs on an operating system. In alternative configurations, hypervisor 1440 may be a type-1 or native/bare-metal hypervisor that runs directly on hardware to control the hardware and manage the guest operating systems. In a type-2 configuration, an additional guest virtual machine or machines may be provisioned to run thread preference selector 1442 and thread scheduler 1444.

Physical hardware beneath hypervisor 1440 may include processor 1470 and shared hardware resources 1480. Processor 1470 includes core A 1460A and core B 1460B. In an SMT-enabled system, each core can include multiple logical processors (e.g., 1464A(1), 1464A(2), 1464B(1), 1464B(2)) with respective threads (e.g., 1465A(1), 1465A(2), 1465B(1), 1465B(2)). Core-specific resources such as core A resources 1490A and core B resources 1490B can include, but are not limited to, core-specific caches (e.g., 1492A, 1492B). Shared hardware resources 1480 can include, but are not limited to, shared cache 1482, bus interface 1484, and memory 1486. In at least one embodiment, memory 1488 is part of memory 1486, which may be a main memory (e.g., random access memory (RAM)) for computing system 1400. Not shown in FIG. 14 is storage (e.g., hard disk, solid state drives, etc.) that can be provisioned in computing system 1400 for storing data and code. Other shared hardware resources to which performance biasing may be applicable could include, but are not necessarily limited to internal registers, access ports, out of order microarchitecture features, etc.

LP performance biasing and core performance biasing can be supported by various infrastructure (which has been previously described herein) in virtualized computing system 1400. In particular, in at least one embodiment, the guest software of guest virtual machines 1420 and 1430 can include of respective thread preference selectors 1422 and 1432 and respective thread schedulers 1424 and 1434. In at least one embodiment, hypervisor 1440 can include a thread preference selector 1442 and a thread scheduler 1444.

Thread preference indicators 1450 can be provided to hardware. In one example, thread preference indicators 1450 may be stored in any suitable storage or memory, such as in a hardware register of processor 1470. If core performance biasing is supported in virtualized computing system 1400, then processor 1470 can include core computation circuit 1472. If LP performance biasing is supported in virtualized computing system 1400, then core A 1460A and core B 1460B, of processor 1470 can each include a logical processor (LP) computation circuit 1462A and 1462B. This example represents a possible implementation of embodiments of the present disclosure. It should be appreciated, however, that any number of different implementations are covered by the broad concepts described herein. For example, additional hypervisors, guest operating machines, or virtual elements could similarly benefit from the broad teachings discussed herein.

It will be apparent from prior descriptions herein that virtualized computing system 1400 may be configured in any of the following ways: 1) SMT-enabled system with LP performance biasing, 2) SMT-enabled system with LP performance biasing and core performance biasing, or 3) non SMT-enabled system with core performance biasing. In an SMT-enabled system with LP performance biasing, cores 1460A and 1460E may contain respective LP computation circuit 1462A and 1462B. In an SMT-enabled system with LP and core performance biasing, cores 1460A and 1460E may contain respective LP computation circuit 1462A and 1462B, and processor 1470 may contain core computation circuit 1472. In a non-SMT-enabled system, processor 1470 may contain core computation circuit 1472 to enable core performance biasing. Any of the LP performance biasing functions and/or core performance biasing functions as described with reference to FIGS. 1-11, could be implemented in a virtual environment, such as virtualized computing system 1400 configured with appropriate hardware (e.g., LP computation circuits 1462A, 1462B, core computation circuit 1472, etc.) and software (e.g., thread preference selectors 1422, 1432, 1442, thread schedulers 1424, 1434, 1444).

It should be further noted, that the relative performance biasing functions described herein could be further extended across processors in a multi-socketed system for performance biasing of resources shared by different processors. Processor performance biasing, core performance biasing, and LP performance biasing may be combined in any suitable manner. For example, in one embodiment, only processor performance biasing may be applied to the system. In another embodiment, processor performance biasing and core e performance biasing may be applied to the system. In yet another embodiment, processor performance biasing, core performance biasing, and LP performance biasing may be applied to the system. In yet another embodiment, processor performance biasing and LP performance biasing may be applied to the system. The LP performance biasing and core performance biasing could be performed as previously described herein. The processor performance biasing could be performed in a manner similar to core performance biasing as previously described herein. Furthermore, any of these embodiments may be implemented in a virtualized environment.

The figures described below detail exemplary architectures and systems to implement embodiments of the above. In some embodiments, one or more hardware components and/or instructions described above are emulated as detailed below, or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 15-23.

Embodiments of the instruction(s) detailed above may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats) For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Figure 15:
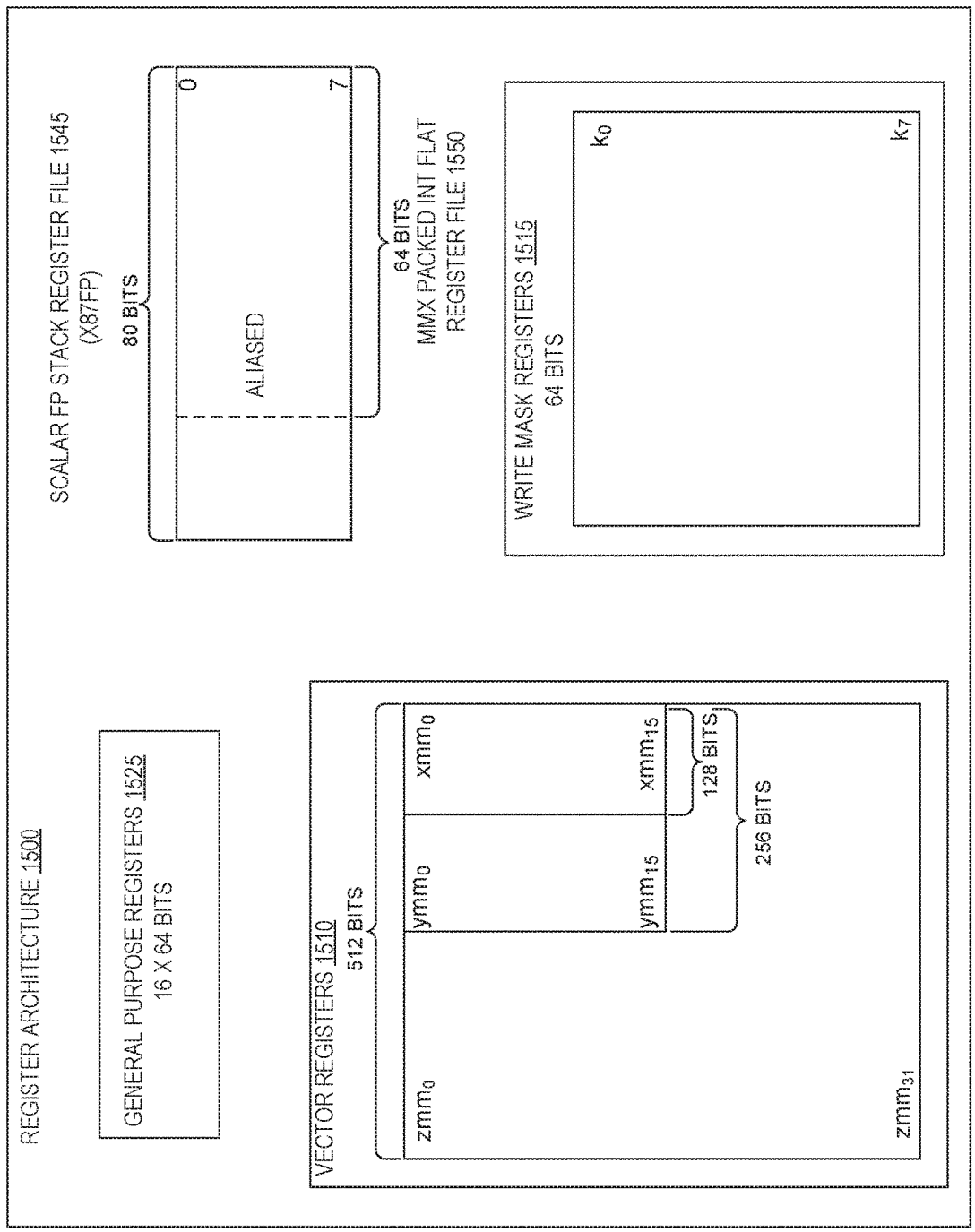
FIG. 15 is a block diagram of a register architecture in accordance with certain embodiments.

FIG. 15 is a block diagram of a register architecture 1500 according to one embodiment of the present disclosure. In the embodiment illustrated, there are 32 vector registers 1510 that are 512 bits wide; these registers are referenced as zrnm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

In other words, a vector length field selects between a maximum length and one or more other shorter lengths, where each such shorter length is half the length of the preceding length; and instructions templates without the vector length field operate on the maximum vector length. Further, in one embodiment, the class B instruction templates of a specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the present disclosure may use wider or narrower registers. Additionally, alternative embodiments of the present disclosure may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 16A is a block diagram illustrating both an exemplary in-order pipeline and an exemplary register renaming, out-of-order issue/execution pipeline according to one or more embodiments of this disclosure. FIG. 16B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like. In addition, processor core 1690 and its components represent example architecture that could be used to implement cores 160A-B, 860A-D, and 1460A-B and at least some of their respective components.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decode stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the scheduling stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multi-threading (SMT) (executing two or more parallel sets of operations or threads), and may do so in a variety of ways including time sliced multithreading, simultaneous multi-threading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 17B:
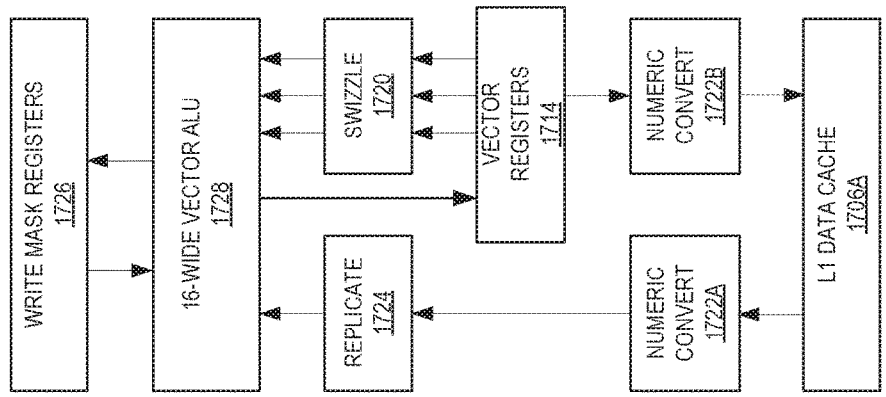
FIGS. 17A-17B illustrate a block diagram of a more specific exemplary in-order core architecture, which core would be one of several logic blocks (including other cores of the same type and/or different types) in a chip in accordance with certain embodiments.
Figure 17A:
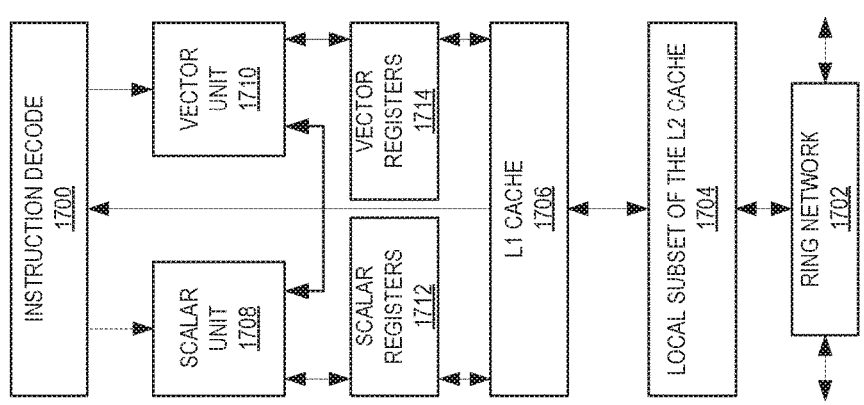

FIGS. 17A-17B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application. The in-order core architecture illustrated in FIGS. 17A-17B represents example architecture that could be used to implement cores 160A-B, 860A-D, and 1460A-B and at least some of their respective components.

FIG. 17A is a block diagram of a single processor core, along with its connection to the on-die interconnect network 1702 and with its local subset of the Level 2 (L2) cache 1704, according to one or more embodiments of this disclosure. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the present disclosure may use a different approach (e.g., use a single register set or include a communication path that allows data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network 1702 is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to one or more embodiments of this disclosure. FIG. 17B includes an L1 data cache 1706A, part of the L2 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
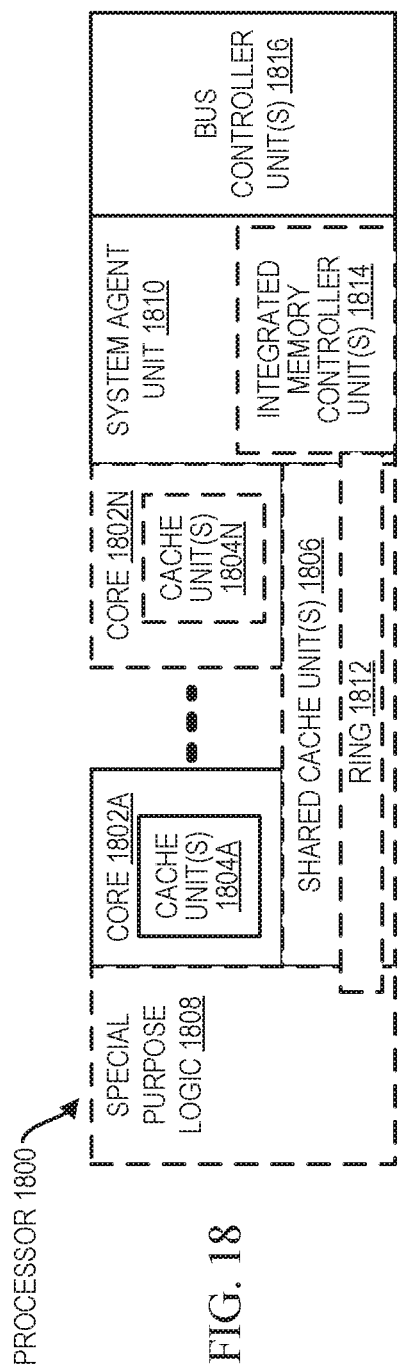
FIG. 18 is a block diagram of a processor that may have more than one core, may have an integrated memory controller, and may have integrated graphics in accordance with certain embodiments.

FIG. 18 is a block diagram of a processor 1800 that may have more than one core, may have an integrated memory controller, and may have integrated graphics according to one or more embodiments of this disclosure. The solid lined boxes in FIG. 18 illustrate a processor 1800 with a single core 1802A, a system agent unit 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808. Processor 1800 and its components (e.g., cores 1802A-N, cache unit(s) 1804A-N, shared cache unit(s) 1806, etc.) represent example architecture that could be used to implement processors 170, 870, and 1470 and at least some of their respective components.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in--order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCol, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802A-N.

In some embodiments, one or more of the cores 1802A-N are capable of multithreading, including simultaneous multithreading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

In an embodiment for providing logical processor performance biasing or core performance biasing, other hardware and/or software can obtain and leverage the thread preference indicators to enable desired (or needed) performance adjustments to the threads of a core, and/or desired (or needed) performance adjustments to the cores of a processor. For example, if computing system 100, 800, or 1400 is implemented with a PCU (e.g., PCU of system agent unit 1810), the PCU may obtain thread preference indicators (e.g., 150, 850, 1450). The PCU can evaluate the thread preference indicators and provide information derived from evaluating the thread preference indicators to the core or cores to enable optimal power and performance balancing between each core's threads and/or between the cores.

The cores 1802A-N may be homogenous or heterogeneous in terms of architecture instruction set; that is, two or more of the cores 1802A-N may be capable of executing the same instruction set, while others may be capable of executing only a subset of that instruction set or a different instruction set.

FIGS. 19-22 are block diagrams of exemplary computer architectures that may be used to implement the performance bias teachings herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable for implementing performance bias features disclosed herein. In particular, the logical processor performance bias features, core performance bias features, processor performance bias features, and/or thread scheduling features disclosed herein (e.g., with reference to FIGS. 1-14) could be implemented in any one or more of the computer architectures of FIGS. 19-22.

Figure 19:
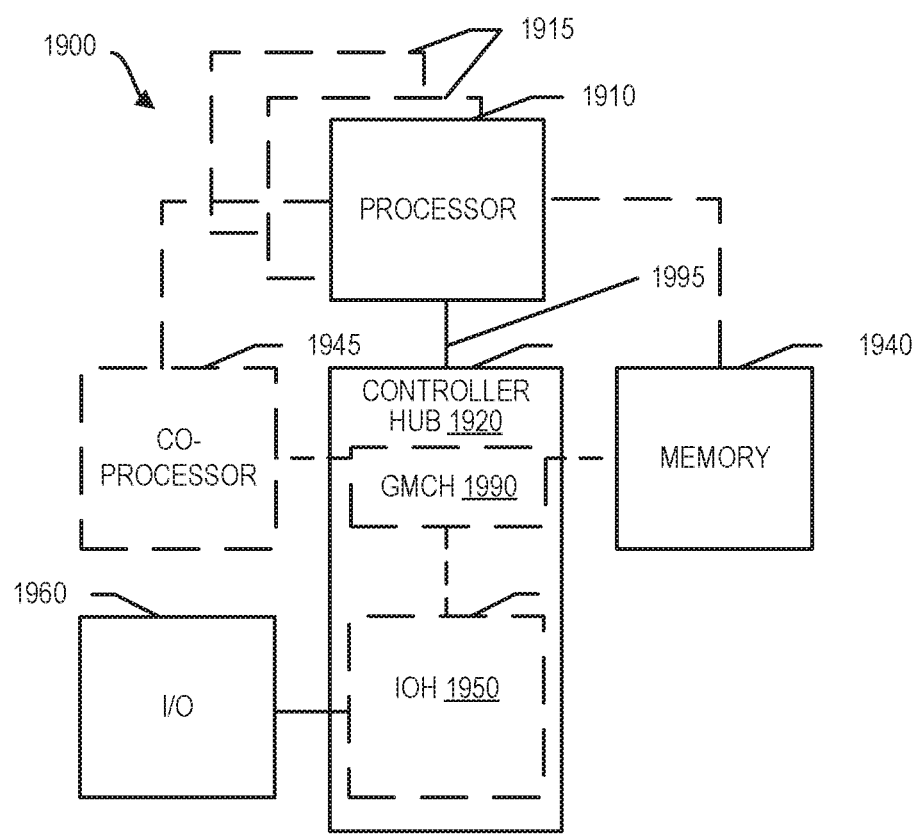
FIGS. 19-22 are block diagrams of exemplary computer architectures in accordance with certain embodiments.

Referring now to FIG. 19, shown is a block diagram of a system 1900 in accordance with at least one embodiment of the present disclosure. The system 1900 may include one or more processors 1910, 1915, which are coupled to a controller hub 1920. In one embodiment, the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
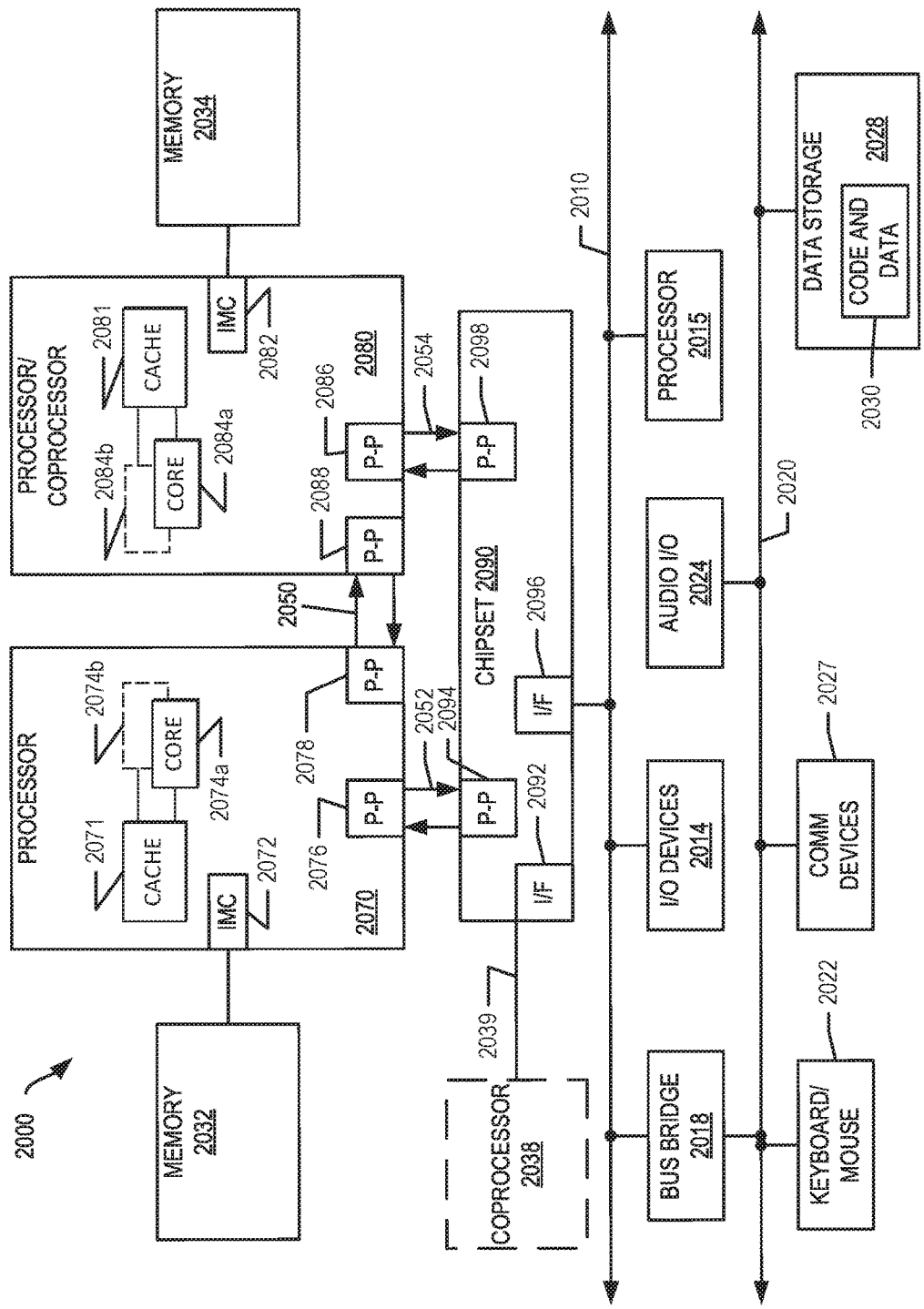

Referring now to FIG. 20, shown is a block diagram of a first more specific exemplary system 2000 in accordance with one or more embodiments of the present disclosure. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In at least one embodiment of this disclosure, processors 2070 and 2080 are respectively processors 1910 and 1915, while coprocessor 2038 is coprocessor 1945. In another embodiment, processors 2070 and 2080 are respectively processor 1910 coprocessor 1945. In addition, processors 2070 and 2080 and their components (e.g., cores 2074*a-b* and 2084*a-b*, shared cache 2071 and 2081, memories 2032 and 2034, etc.) represent examples of processors that could be used to implement processors 170, 870, and 1470 and at least some of their respective components.

Processors 2070 and 2080 may each include one or more cores 2074*a-b* and 2084*a-b*. Processors 2070 and 2080 may also include integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors. Memories 2032 and/or 2034 may store various data to be used by processors 2070 and 2080 in achieving certain operations outlined herein.

Processors 2070, 2080 may each exchange information with a chipset 2090 via individual P-P interfaces 2052, 2054 using point to point interface circuits 2076, 2094, 2086, 2098. As shown herein, chipset 2090 is separated from processing elements 2070 and 2080. However, in an embodiment, chipset 2090 is integrated with processing elements 2070 and 2080. Also, chipset 2090 may be partitioned differently with fewer or more integrated circuits. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (e.g., 2071 and/or 2081) may be included in either processor or outside of both processors, yet connected with the processors via P-P interconnect, such that either or both processors' local cache information (e.g., data requested by a processor) may be stored in the shared cache if a processor is placed into a low power mode. Shared caches 2071 and 2081 represent examples of shared caches 182, 882, and 1482.

Chipset 2090 may be coupled to a first bus 2010 via an interface 2096. In one embodiment, first bus 2010 may be a Peripheral Component Interconnect (PCI) bus, or a bus such as a PCI Express bus or another third generation I/O interconnect bus, although the scope of the present disclosure is not so limited.

As shown in FIG. 20, various I/O devices 2014 may be coupled to first bus 2010, along with a bus bridge 2018 which couples first bus 2010 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2010. In one embodiment, second bus 2020 may be a low pin count (LPC) bus. Various devices may be coupled to second bus 2020 including, for example, a keyboard and/or mouse 2022 or other input devices (e.g., touch screen, trackball, joystick, etc.), communication devices 2026 (e.g., modems, network interface cards, or other types of communication devices that may communicate through a computer network), and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
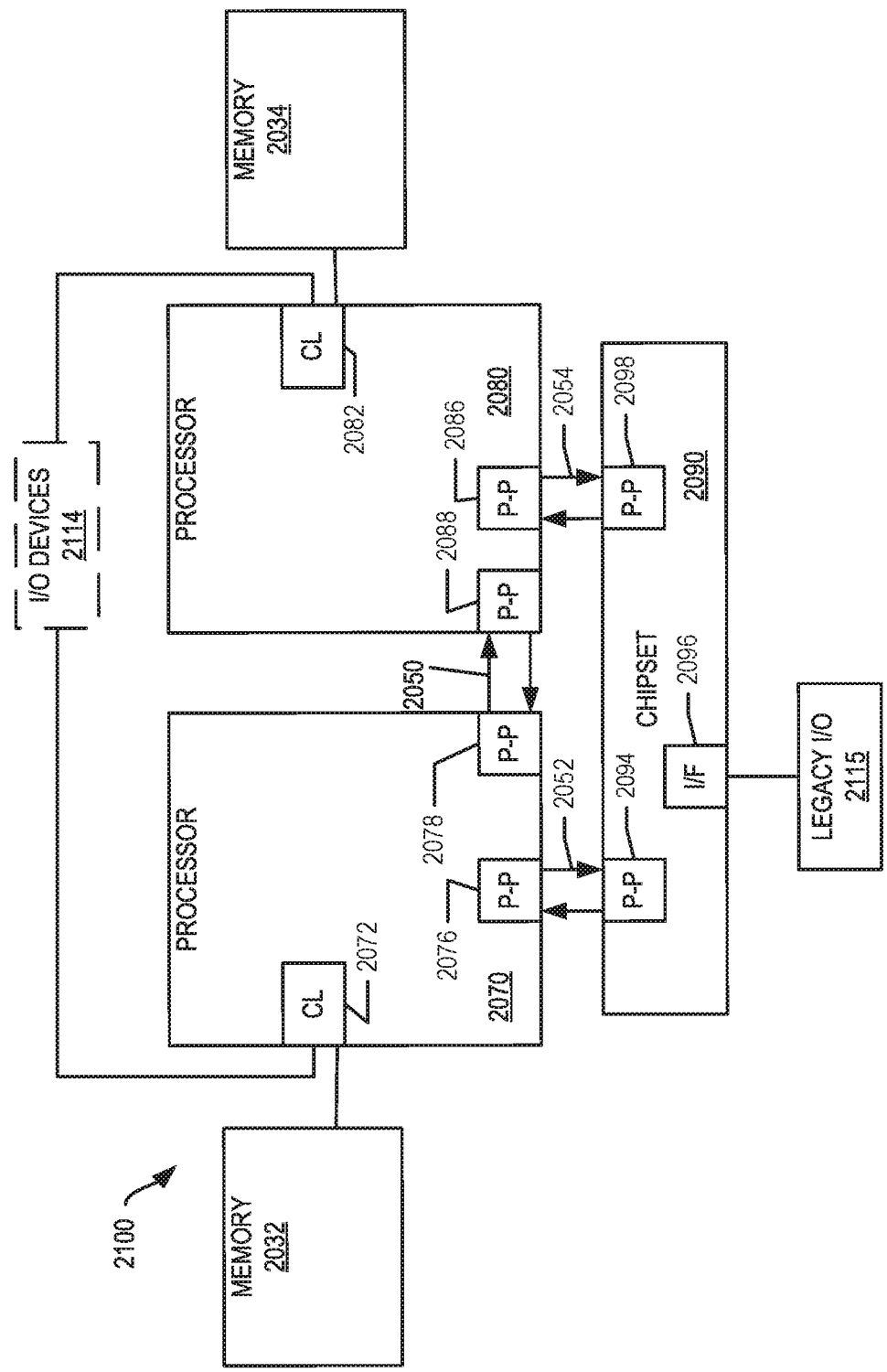

Referring now to FIG. 21, shown is a block diagram of a second more specific exemplary system 2100 in accordance with at least one embodiment of the present disclosure. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
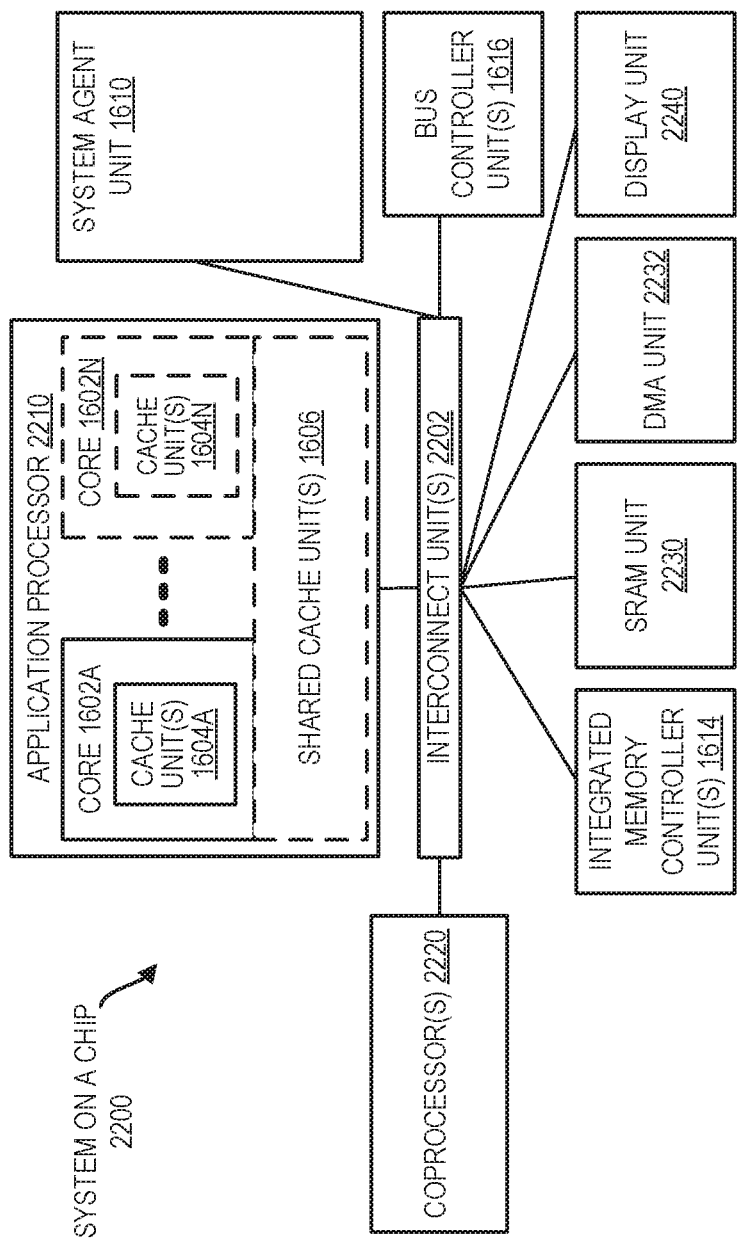

Referring now to FIG. 22, shown is a block diagram of a SoC 2200 in accordance with at least one embodiment of the present disclosure. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform at least some of the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-OMs), compact disk rewritables (CD-Ws), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
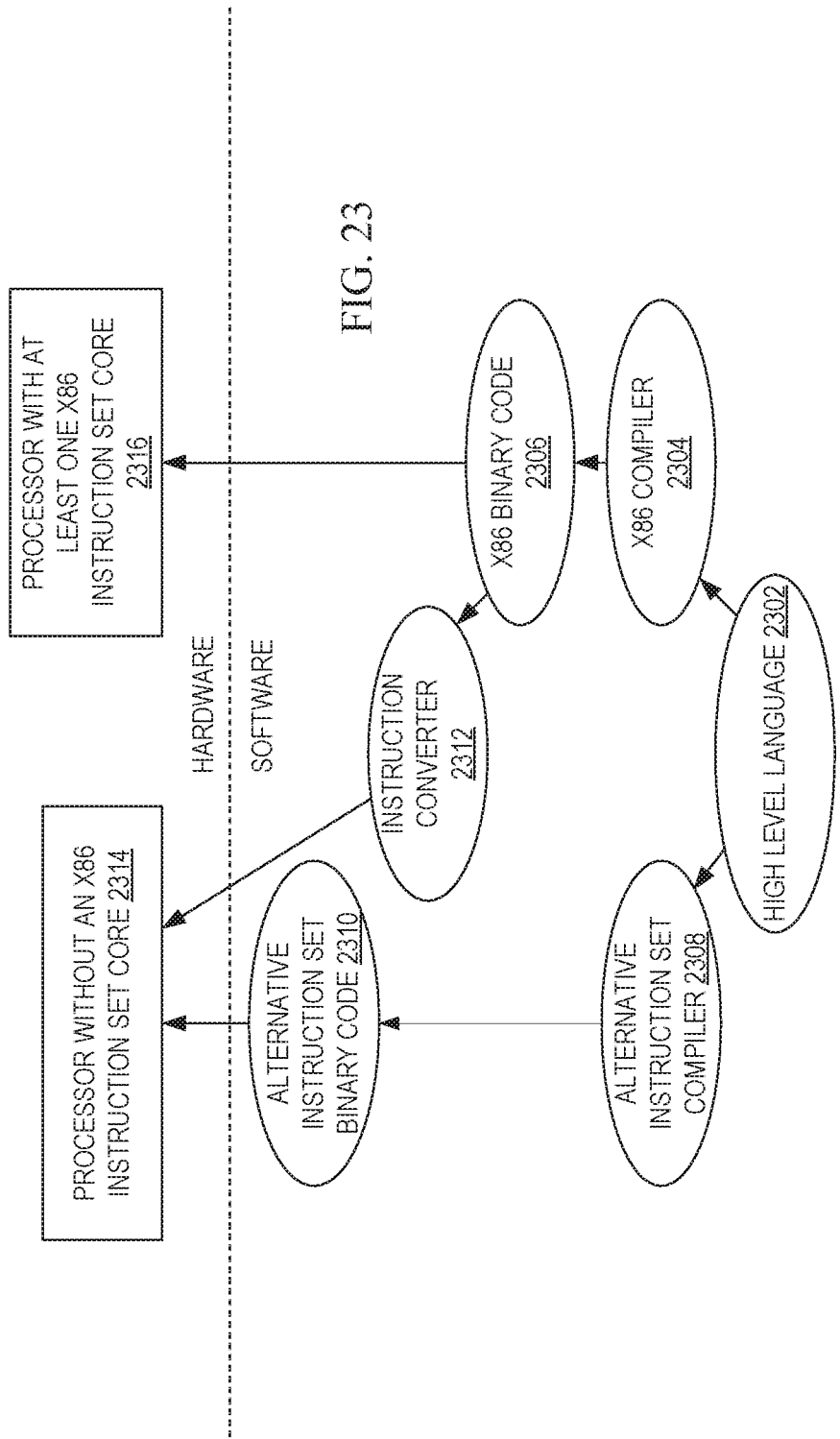
FIG. 23 is a block diagram contrasting the use of a software instruction converter to convert binary instructions in a source instruction set to binary instructions in a target instruction set in accordance with certain embodiments.

FIG. 23 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 23 shows a program in a high-level language 2302 may be compiled using an x86 compiler 2304 to generate x86 binary code 2306 that may be natively executed by a processor with at least one x86 instruction set core 2116. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high-level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Computing systems of FIGS. 1, 8, and 14-23 may include software to achieve (or to foster) at least some of the dynamic relative performance biasing functions for cores and/or logical processors, as outlined herein. For example, system applications (e.g., 120, 820, 1420), user applications (e.g., 130, 830, 1430), operating systems (e.g., 140, 840, 1428, 1438), hypervisors (e.g., 1440), thread preference selectors (e.g., 122, 132, 142, 822, 832, 842, 1422, 1432, 1442), and thread schedulers (e.g., 124, 134, 144, 824, 834, 844 1424, 1434, 1444) may facilitate some of the operations described herein. Note that in one example, each of these elements can be coupled to an internal structure (e.g., processors 170, 870, 1470, memory 180, 880, 1480, etc.) to achieve the intended functionality. In other embodiments, these dynamic relative performance biasing functions may be executed externally to these elements, or included in some other component or computing system to achieve this intended functionality. Computing systems may include this software (or reciprocating software) that can coordinate with other elements (e.g., hardware, firmware) in order to achieve the operations, as outlined herein. For example, at least some of the dynamic relative performance biasing activities may be carried out by hardware (e.g., LP computation circuit 162A-B, 1462A-B), core computation circuit 872, 1472), implemented externally to cores or processors, or included in some other component coupled to processing devices (e.g., 170, 870, 1470) to achieve the intended functionality. Generally, one or several devices, hosts, or computing systems may include any suitable algorithms, hardware, software, firmware, components, modules, interfaces, or objects that facilitate the operations thereof.

Note that with the numerous examples provided herein, interaction may be described in terms of two, three, four, or more processors, logical processors, user applications, system applications, operating systems, thread selectors, thread preference selectors, LP computation circuits, core computation circuits, and/or other components. However, this has been done for purposes of clarity and example only. It should be appreciated that the system can be consolidated or divided (e.g., segmented, partitioned, separated, etc.) in any suitable manner. Along similar design alternatives, any of the illustrated circuits, logic, applications, modules, elements, processors, devices, systems, registers, software, hardware, and other components of FIGS. 1, 8, and 14-23 may be combined in various possible configurations, all of which are clearly within the broad scope of this Specification. For example, the LP computation circuits and core computation circuits may be combined with, or may coordinate with, other hardware such as scheduling and/or allocation hardware units to effectively bias hardware resources, execution cycles, and/or component speeds allocated to logical processors based on LP-RPB values and/or allocated to cores based on C-RPB values. It should be appreciated that the systems of FIGS. 1, 8, and 14-23 (and their teachings) are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations in the preceding flowcharts and diagrams illustrating interactions illustrate only some of the possible dynamic relative performance biasing operations that may be executed by, or within, computing systems 100, 800, and 1400. Some of these operations mays be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. For example, LP relative performance biasing for logical processors, relative performance biasing for cores, relative performance biasing for processors, or any combination thereof may be implemented as previously described herein, and in other ways that may not be specifically outlined herein. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. Example L1 provides an apparatus (e.g., comprising a first core including a first computation circuit), a system (e.g., comprising a memory and a processor coupled to the memory, the processor including a first core), one or more machine readable mediums, a method, and/or hardware-, firmware-, and/or software-based logic for biasing performance in a processor, where the Example of L1 includes a first core to: identify a first logical processor associated with a first thread of an application and a second logical processor associated with a second thread; obtain first and second thread preference indicators associated with the first and second threads, respectively; compute a first relative performance bias value for the first logical processor based, at least in part, on a relativeness of the first and second thread preference indicators; and adjust a performance bias of the first logical processor based on the first relative performance bias value.

In Example L2, the subject matter of Example L1 can optionally include where the relativeness of the first and second thread preference indicators is used to compute proportional values of the first and second thread preference indicators, and where the first relative performance bias value corresponds to a proportional value of the first thread preference indicator In Example L3, the subject matter of any one of Examples L1-L2 can optionally include where the core is to further decrease a performance bias of the second logical processor based, at least in part, on a second relative performance bias value computed for the second logical processor indicating a second performance preference that is lower than a first performance preference indicated by the first relative performance bias value.

In Example L4, the subject matter of any one of Examples L1-L3 can optionally include where the core is to further increase the performance bias of the first logical processor based, at least in part, on the first relative performance bias value indicating a first performance preference that is higher than a second performance preference indicated by a second relative performance bias value computed for the second logical processor.

In Example L5, the subject matter of Example L4 can optionally include where increasing the performance bias of the first logical processor includes allocating a first share of a hardware resource to the first logical processor based on the first relative performance bias value, where the first share is greater than a second share of the hardware resource allocated to the second logical processor.

In Example L6, the subject matter of Example L5 can optionally include where the hardware resource is one of a core-specific hardware resource that is usable only by the first core or a shared hardware resource that is usable by the first core and one or more other cores in the processor.

In Example L7, the subject matter of any one of Examples L4-L6 can optionally include where increasing the performance bias of the first logical processor includes assigning a first number of execution cycles to the first logical processor and a second number of execution cycles to the second logical processor, where the first number of execution cycles is greater than the second number of execution cycles.

In Example L8, the subject matter of any one of Examples L4-L7 can optionally include where increasing the performance bias of the first logical processor includes increasing utilization, by the first logical processor, of a pipeline component to execute an instruction of the first thread.

In Example L9, the subject matter of Example L8 can optionally include where the pipeline component is selected from a group of pipeline components comprising a decode unit, a rename unit, an allocator unit, a scheduler unit, an execution unit, and a memory access unit.

In Example L10, the subject matter of any one of Examples L1-L9 can optionally include where the first core is to further: detect a change in the first thread preference indicator; compute an updated first relative performance bias value for the first logical processor based, at least in part, on a relativeness of the changed first thread preference indicator and the second thread preference indicator; and adjust the performance bias of the first logical processor based on the updated first relative performance bias value.

In Example L11, the subject matter of any one of Examples L1-L10 can optionally include where the first and second thread preference indicators are obtained from a register populated by one of an operating system, a user application, a system application, a hypervisor, a virtual system application, a virtual user application, or a user.

In Example L12, the subject matter of any one of Examples L1-L11 can optionally include a second core including a third logical processor associated with a third thread, where a third thread preference indicator is associated with the third thread; and one or more instructions stored in a memory, where the one or more instructions, when executed by the processor, cause the processor to: detect a new thread associated with a fourth thread preference indicator; and assign the new thread to an idle logical processor in the second core based, at least in part, on determining that an amount of diversity between the fourth thread preference indicator and the third thread preference indicator associated with the second core is greater than an amount of diversity between the fourth thread preference indicator and the first and second thread preference indicators associated with the first core.

In Example L13, the subject matter of any one of Examples L1-L12 can optionally include where a processor that includes the first core is to compute a third relative performance bias value for the first core based, at least in part, on a relativeness of the first and second thread preference indicators associated with the first core and the third and fourth thread preference indicators associated with a second core; and adjust a core performance bias of the first core based on the third relative performance bias value.

In Example L14, the subject matter of Example L13 can optionally include where adjusting the core performance bias of the first core includes allocating a third share of a shared hardware resource to the first core based on the third relative performance bias value.

In Example L15, the subject matter of Example L14 can optionally include where the first core is to allocate a subset of the third share of the shared hardware resource to the first logical processor based on the first relative performance bias value.

In Example L16, the subject matter of any one of Examples L1-L15 can optionally include where obtaining the first and second thread preference indicators is to read the first and second thread preference indicators.

The following examples pertain to embodiments in accordance with this specification. Example C1 provides an apparatus (e.g., a processor comprising a first core and a second core), a system (e.g., comprising a memory and a processor coupled to the memory, the processor including a first core and a second core), one or more machine readable mediums, a method, and/or hardware-, firmware-, and/or software-based logic for unlocking at least a portion of a device, where the Example of C1 comprises identifying, in a first core, a first logical processor associated with a first thread of an application; identifying, in a second core, a second logical processor associated with a second thread; obtaining first and second thread preference indicators associated with the first and second threads, respectively; computing a first relative performance bias value for the first core based, at least in part, on a relativeness of the first and second thread preference indicators; and adjusting a performance bias of the first core based on the first relative performance bias value.

In Example C2, the subject matter of Example C1 can optionally include where the relativeness of the first and second thread preference indicators is used to compute proportional values of the first and second thread preference indicators, and where the first relative performance bias value corresponds to a proportional value of the first thread preference indicator.

In Example C3, the subject matter of any one of Examples C1-C2 can optionally include decreasing a performance bias of the second core based, at least in part, on a second relative performance bias value indicating a second performance preference for the second core that is lower than a first performance preference for the first core indicated by the first relative performance bias value.

In Example C4, the subject matter of any one of Examples C1-C3 can optionally include increasing the performance bias of the first core based, at least in part, on the first relative performance bias value indicating a first performance preference for the first core that is higher than a second performance preference of the second core indicated by a second relative performance bias value computed for the second core.

In Example C5, the subject matter of Example C4 can optionally include where increasing the performance bias of the first logical processor includes allocating a first share of a hardware resource to the first core based on the first relative performance bias value, where the first share is greater than a second share of the hardware resource allocated to the second core.

In Example C6, the subject matter of Example C5 can optionally include where the hardware resource is one of a shared hardware resource that is usable by at least the first core and the second core.

In Example C7, the subject matter of any one of Examples C1-C6 can optionally include detecting a change in the first thread preference indicator; computing an updated first relative performance bias value for the first core based, at least in part, on a relativeness of the changed first thread preference indicator and the second thread preference indicator; and adjusting the performance bias of the first core based on the updated first relative performance bias value.

In Example C8, the subject matter of any one of Examples C1-C7 can optionally include where the first and second thread preference indicators are obtained from a register populated by one of an operating system, a user application, a system application, a hypervisor, a virtual system application, a virtual user application, or a user.

In Example C9, the subject matter of any one of Examples C1-C8 can optionally include a second processor including a third core with a third logical processor running a third thread, where a third thread preference indicator is associated with the third thread; and one or more instructions stored in a memory, where the one or more instructions, when executed by at least one of the processors, cause the at least one of the processor to: detect a new thread associated with a fourth thread preference indicator, and is to assign the new thread to an idle logical processor in another core of the second processor based, at least in part, on determining that an amount of diversity between the fourth thread preference indicator and the third thread preference indicator is greater than an amount of diversity between the fourth thread preference indicator and the first and second thread preference indicators.

Example Y1 provides an apparatus for dynamically biasing performance in a processor, where the apparatus comprises means for performing the method of any one of the preceding Examples.

In Example Y2, the subject matter of Example Y1 can optionally include that the means for performing the method comprises at least one processor and at least one memory element.

In Example Y3, the subject matter of Example Y2 can optionally include that the at least one memory element comprises machine readable instructions that when executed, cause the apparatus to perform the method of any one of the preceding Examples.

In Example Y4, the subject matter of any one of Examples Y1-Y3 can optionally include that the apparatus is one of a computing system, a processing element, or a system-on-a-chip.

Example Y5 provides at least one machine readable storage medium comprising instructions for dynamically biasing performance in a processor, where the instructions when executed cause at least one processor to realize an apparatus, realize a system, or implement a method as in any one of the preceding Examples.

What is claimed is:

1. A system comprising:
   a memory; and
   a processor coupled to the memory, the processor including a first core to:
   identify a first logical processor associated with a first thread of an application and a second logical processor associated with a second thread of the application;
   obtain first and second thread preference indicators associated with the first and second threads of the application, respectively;
   compute a first relative performance bias value for the first logical processor based, at least in part, on a relativeness of the first and second thread preference indicators;
   dynamically adjust a performance bias of the first logical processor based on the first relative performance bias value computed for the first logical processor, wherein the performance bias of the first logical processor is to be increased based, at least in part, on the first relative performance bias value computed for the first logical processor indicating a first performance preference that is higher than a second performance preference indicated by a second relative performance bias value computed for the second logical processor; and
   allocate a first share of a first hardware resource to the first logical processor based on the dynamically adjusted performance bias of the first logical processor.

2. The system of claim 1, wherein the relativeness of the first and second thread preference indicators is used to compute proportional values of the first and second thread preference indicators, and wherein the first relative performance bias value corresponds to a proportional value of the first thread preference indicator.

3. The system of claim 1, wherein the first core is to further:
   decrease a performance bias of the second logical processor based, at least in part, on the second relative performance bias value computed for the second logical processor indicating the second performance preference that is lower than the first performance preference indicated by the first relative performance bias value computed for the first logical processor.

4. The system of claim 1, wherein increasing the performance bias of the first logical processor includes:
   allocating a second share of a second hardware resource to the first logical processor based on the first relative performance bias value computed for the first logical processor, wherein the second share of the second hardware resource allocated to the first logical processor is greater than a third share of the second hardware resource allocated to the second logical processor.

5. The system of claim 1, wherein the first hardware resource is one of a core-specific hardware resource that is usable only by the first core or a shared hardware resource that is usable by the first core and one or more other cores in the processor.

6. The system of claim 1, wherein increasing the performance bias of the first logical processor includes:
   assigning a first number of execution cycles to the first logical processor and a second number of execution cycles to the second logical processor, wherein the first number of execution cycles is greater than the second number of execution cycles.

7. The system of claim 1, wherein increasing the performance bias of the first logical processor includes:
   increasing, by the first logical processor, utilization of a pipeline component to execute an instruction of the first thread of the application.

8. The system of claim 7, wherein the pipeline component is one of a decode unit, a rename unit, an allocator unit, a scheduler unit, an execution unit, or a memory access unit.

9. The system of claim 1, wherein the first core is to further:
   detect a change in the first thread preference indicator;
   compute an updated first relative performance bias value for the first logical processor based, at least in part, on a relativeness of the changed first thread preference indicator and the second thread preference indicator; and
   dynamically adjust the performance bias of the first logical processor based on the updated first relative performance bias value computed for the first logical processor.

10. The system of claim 1, wherein the first and second thread preference indicators are obtained from a register populated by one of an operating system, a user application, a system application, a hypervisor, a virtual system application, a virtual user application, or a user.

11. The system of claim 1, wherein the processor further includes:

a second core including a third logical processor associated with a third thread, wherein a third thread preference indicator is associated with the third thread; and
one or more instructions stored in the memory, wherein the one or more instructions, when executed by the processor, cause the processor to:
  detect a new thread associated with a fourth thread preference indicator; and
  assign the new thread to an idle logical processor in the second core based, at least in part, on determining that an amount of diversity between the fourth thread preference indicator and the third thread preference indicator associated with the second core is greater than an amount of diversity between the fourth thread preference indicator and the first and second thread preference indicators associated with the first core.

12. The system of claim 11, wherein the processor is to further:
  compute a third relative performance bias value for the first core based, at least in part, on a relativeness of the first and second thread preference indicators associated with the first core and the third and fourth thread preference indicators associated with the second core; and
  dynamically adjust a core performance bias of the first core based on the third relative performance bias value computed for the first core.

13. The system of claim 12, wherein dynamically adjusting the core performance bias of the first core includes:
  allocating a second share of a second hardware resource to the first core based on the third relative performance bias value computed for the first core, wherein the second hardware resource is shared between the first core and the second core.

14. The system of claim 13, wherein the first core is to further:
  allocate a subset of the second share of the second hardware resource to the first logical processor based on the first relative performance bias value computed for the first logical processor.

15. The system of claim 1, wherein obtaining the first and second thread preference indicators is to read the first and second thread preference indicators.

16. An apparatus comprising:
a first core including a first computation circuit to:
  identify a first logical processor associated with a first thread of an application and a second logical processor associated with a second thread of the application;
  obtain first and second thread preference indicators associated with the first and second threads of the application, respectively;
  compute a first relative performance bias value for the first logical processor based, at least in part, on a relativeness of the first and second thread preference indicators;
  dynamically adjust a performance bias of the first logical processor based on the first relative performance bias value computed for the first logical processor, wherein the performance bias of the first logical processor is to be increased based, at least in part, on the first relative performance bias value computed for the first logical processor indicating a first performance preference that is higher than a second performance preference indicated by a second relative performance bias value computed for the second logical processor; and
  allocate a first share of a first hardware resource to the first logical processor based on the dynamically adjusted performance bias of the first logical processor.

17. The apparatus of claim 16, wherein the relativeness of the first and second thread preference indicators is used to compute proportional values of the first and second thread preference indicators, and wherein the first relative performance bias value corresponds to a proportional value of the first thread preference indicator.

18. The apparatus of claim 16, wherein the first computation circuit is to further:
  decrease a performance bias of the second logical processor based, at least in part, on the second relative performance bias value computed for the second logical processor indicating the second performance preference that is lower than the first performance preference indicated by the first relative performance bias value computed for the first logical processor.

19. The apparatus of claim 16, wherein increasing the performance bias of the first logical processor includes:
  allocating a second share of a second hardware resource to the first logical processor based on the first relative performance bias value computed for the first logical processor, wherein the second share of the second hardware resource allocated to the first logical processor is greater than a third share of the second hardware resource allocated to the second logical processor.

20. The apparatus of claim 16, wherein increasing the performance bias of the first logical processor includes:
  assigning a first number of execution cycles to the first logical processor and a second number of execution cycles to the second logical processor, wherein the first number of execution cycles is greater than the second number of execution cycles.

21. The apparatus of claim 16, wherein the first computation circuit is to further:
  detect a change in the first thread preference indicator;
  compute an updated first relative performance bias value for the first logical processor based, at least in part, on a relativeness of the changed first thread preference indicator and the second thread preference indicator; and
  dynamically adjust the performance bias of the first logical processor based on the updated first relative performance bias value computed for the first logical processor.

22. A method comprising:
identifying, in a first core, a first logical processor associated with a first thread of an application and a second logical processor associated with a second thread of the application;
obtaining first and second thread preference indicators associated with the first and second threads of the application, respectively;
computing a first relative performance bias value for the first logical processor based, at least in part, on a relativeness of the first and second thread preference indicators;
dynamically adjusting a performance bias of the first logical processor based on the first relative performance bias value computed for the first logical processor, wherein the performance bias of the first logical processor is to be increased based, at least in part, on the first relative performance bias value computed for the first logical processor indicating a first performance preference that is higher than a second performance preference indicated by a second relative performance bias value computed for the second logical processor; and allocating a first share of a first hardware resource to the first logical processor based on the dynamically adjusted performance bias of the first logical processor.

23. The method of claim 22, further comprising:

detecting a change in the first thread preference indicator;

computing an updated first relative performance bias value for the first logical processor based, at least in part, on a relativeness of the changed first thread preference indicator and the second thread preference indicator; and dynamically adjusting the performance bias of the first logical processor based on the updated first relative performance bias value computed for the first logical processor.

24. The method of claim 22, further comprising:

computing a third relative performance bias value for the first core based, at least in part, on a relativeness of the first and second thread preference indicators associated with the first core and third and fourth thread preference indicators associated with a second core; and dynamically adjusting a core performance bias of the first core based on the third relative performance bias value computed for the first core.

25. The method of claim 22, further comprising:

decreasing a performance bias of the second logical processor based, at least in part, on the second relative performance bias value computed for the second logical processor indicating the second performance preference that is lower than the first performance preference indicated by the first relative performance bias value computed for the first logical processor.

* * * * *